(12) United States Patent
Ishii et al.

(10) Patent No.: US 8,301,823 B2
(45) Date of Patent: Oct. 30, 2012

(54) BUS CONTROLLER ARRANGED BETWEEN A BUS MASTER AND A NETWORKED COMMUNICATION BUS IN ORDER TO CONTROL THE TRANSMISSION ROUTE OF A PACKET THAT FLOWS THROUGH THE COMMUNICATION BUS, AND SIMULATION PROGRAM TO DESIGN SUCH A BUS CONTROLLER

(75) Inventors: Tomoki Ishii, Kyoto (JP); Takao Yamaguchi, Osaka (JP); Atsushi Yoshida, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/247,163

(22) Filed: Sep. 28, 2011

(65) Prior Publication Data

US 2012/0079147 A1 Mar. 29, 2012

Related U.S. Application Data

(63) Continuation of application No. PCT/JP2010/004290, filed on Jun. 29, 2010.

(30) Foreign Application Priority Data

Jul. 7, 2009 (JP) .................................. 2009-161029
Oct. 8, 2009 (JP) .................................. 2009-234538

(51) Int. Cl.
*G06F 13/00* (2006.01)
(52) U.S. Cl. ..... 710/316; 370/351; 370/364; 370/395.41
(58) Field of Classification Search .................. 710/107, 710/316; 370/351, 359, 364, 395.41
See application file for complete search history.

(56) References Cited

U.S. PATENT DOCUMENTS

| 5,940,372 A | 8/1999 | Bertin et al. |
| 5,959,995 A | 9/1999 | Wicki et al. |
| 6,510,135 B1 * | 1/2003 | Almulhem et al. ........... 370/229 |

(Continued)

FOREIGN PATENT DOCUMENTS

JP  9-36893 A  2/1997

(Continued)

OTHER PUBLICATIONS

International Search Report for corresponding International Application No. PCT/JP2010/004290 mailed Jul. 27, 2010.

(Continued)

*Primary Examiner* — Glenn A Auve
(74) *Attorney, Agent, or Firm* — Renner, Otto, Boisselle & Sklar, LLP

(57) ABSTRACT

A bus controller includes: a data receiving section for receiving output status information from other bus controllers on transmission routes available; a route load detecting section for calculating uniformity of distribution index indicating the degree of non-uniformity in transmission flow rate between the routes based on the output status information; a routing section for determining transmission routes, of which the transmission flow rates have been adjusted by reference to the index; a packet assembling section for generating a packet; a data output section for outputting the packet through one of output ports; a header analyzing section for determining which output port is connected to a transmission route chosen by reference to information about the packet receiving end; and a data output section for outputting the packet through the output port.

13 Claims, 16 Drawing Sheets

U.S. PATENT DOCUMENTS

2010/0002589 A1    1/2010  Ciordas et al.

FOREIGN PATENT DOCUMENTS

| JP | 2002-247087 A | 8/2002 |
| JP | 2002-305541 A | 10/2002 |
| JP | 3816531 B | 6/2006 |
| JP | 2007-074074 A | 3/2007 |
| WO | 97/31464 A | 8/1997 |

OTHER PUBLICATIONS

International Preliminary Report on Patentability for corresponding International Application No. PCT/JP2010/004290 dated Feb. 22, 2011.

Wakita et al., "Delay Reduction Algorithm by Balancing Distribution of Traffic for Odd-Even Turn Model in NoC", IEICE Technical Report, VLD 2008-152 (Mar. 2009), pp. 153-158 and English Abstract.

Article 34 Amendment for corresponding International Application No. PCT/JP2010/004290.

* cited by examiner

| PRIORITY LEVEL ($\delta$) | NUMBER OF CYCLES OCCUPIED AT OUTPUT PORT | | |
|---|---|---|---|
| | AVERAGE ($\omega$ave) | MAXIMUM ($\omega$max) | MINIMUM ($\omega$min) |
| 1 | 30,976,563 | 15,488,300 | 10,325,521 |
| 2 | | | |
| ⋮ | | | |
| n | | | |

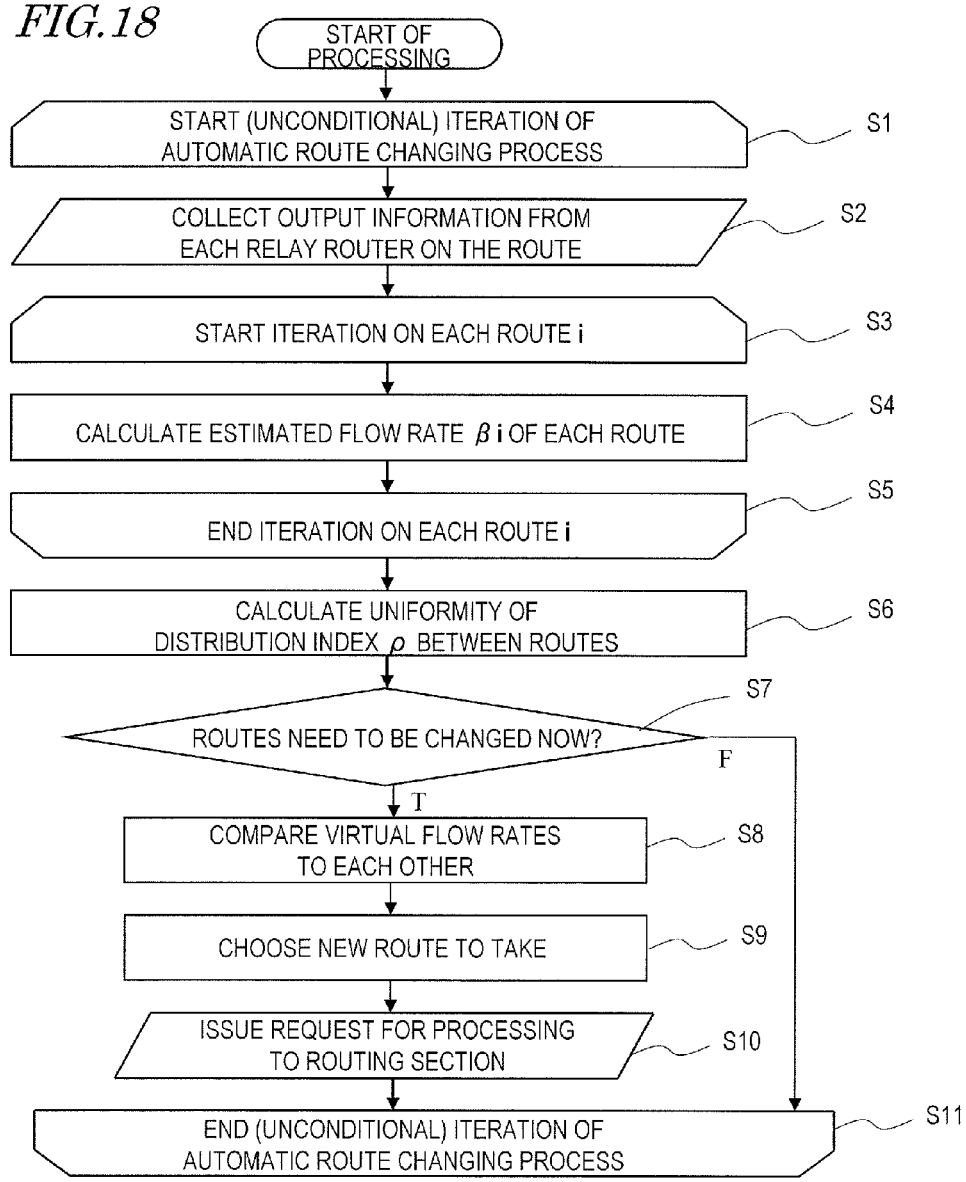

| ESTIMATED AVERAGE RATE | ESTIMATED MAXIMUM RATE |
|---|---|
| $\mu_i$ | $p_i^2$ |

BUS CONTROLLER ARRANGED BETWEEN A BUS MASTER AND A NETWORKED COMMUNICATION BUS IN ORDER TO CONTROL THE TRANSMISSION ROUTE OF A PACKET THAT FLOWS THROUGH THE COMMUNICATION BUS, AND SIMULATION PROGRAM TO DESIGN SUCH A BUS CONTROLLER

This is a continuation of International Application No. PCT/JP2010/004290, with an international filing date of Jun. 29, 2010, which claims priority of Japanese Patent Applications No. 2009-161029, filed on Jul. 7, 2009, and No. 2009-234538, filed on Oct. 8, 2009, the contents of which are hereby incorporated by reference.

BACKGROUND OF THE INVENTION

1. Field of the Invention

The present invention relates to an apparatus, method and program for controlling a networked communication bus for use in a semiconductor chip.

2. Description of the Related Art

Recently, in the fields of built-in computers and general-purpose processors that use an SoC (System on Chip), there is a growing demand for semiconductor chips with enhanced performance. And as the performance of a semiconductor chip has been enhanced these days to meet such a demand, the number of bus masters to be connected to the communication bus on the chip has been increasing and the traffic control to be done on transfer data being transmitted and received through the bus has getting more and more complicated.

For example, the number of functions that a single cellphone terminal can provide by itself has been increasing year by year lately. Specifically, mobile phones of today allow the user to transmit and receive email messages, do Web browsing, and receive and view a so-called "one-seg(ment)" terrestrial digital broadcast. As dedicated ICs that perform part or all of the processing that realizes these various functions serve as bus masters, an appropriate traffic control needs to be done on the data being transmitted and received through a communication bus that connects all of those dedicated ICs together. Meanwhile, a multi-core configuration has been adopted more and more often these days for microprocessing unit (MPU) chips, too. To synchronize respective processor cores functioning as bus masters with each other and make those cores cooperate with each other, an appropriate traffic control also needs to be done on the data being transmitted and received through a communication bus that connects all of those processor cores together.

A conventional design for such a traffic control uses a bus control method for giving a pair of bus masters, to which data is being transferred, the right to use the bus by connecting together respective bus masters with a broad band lumped bus and by turning cross-bar switches. According to such a bus control method, a wiring delay will be caused because the bus needs to circumvent the circuit board. In addition, since the cross-bar switches have to be arranged, an additional area needs to be left for them and the power dissipation also increases by using such switches. On top of that, according to such a lumped bus design, the average bus use efficiency will not increase, the operating frequency of the bus will also rise, and more power will be eventually dissipated by the bus. This is because the operating frequency of the bus is determined so as to guarantee even the highest one of the data transfer rates required by those bus masters.

Thus, to overcome those problems with the lumped bus, a so-called "NoC (Network on Chip)" communication bus that functions as a network by itself has been developed and actually used these days.

For example, FIGS. 1(a) and 1(b) illustrate a configuration for a part of an NoC bus. Specifically, FIG. 1(a) illustrates an exemplary hardware connection and FIG. 1(b) is a schematic representation thereof. As shown in FIGS. 1(a) and 1(b), bus masters 1a, 1b and 1c, all of which are integrated together on a single chip 10, are connected to the same bus 3 by way of their associated bus controllers (R) 2. It should be noted that in all of the drawings attached to this application, the NoC bus is illustrated as in the schematic representation shown in FIG. 1(b).

FIG. 2 illustrates an exemplary configuration for an NoC bus for coupling together a number of bus masters that form a two-dimensional mesh. In this example, a bus controller R for performing a control on a data transfer route is provided for each of various bus masters including microprocessors, DSPs, memories and input/output circuits. And two adjacent ones of those bus controllers R are connected (i.e., linked) together with a short line.

In such a configuration, data can be transferred from a bus master on the transmitting end to a bus master on the receiving end through a number of different communication routes. For example, FIG. 3 illustrates three routes (1), (2) and (3) leading from the transmitting end to the receiving end.

Also, if there are multiple bus masters that provide the same function, then there will be multiple receiving ends and multiple routes leading to those receiving ends. For example, FIG. 4 illustrates three routes leading from one transmitting end to three different receiving ends (1), (2) and (3).

By choosing the best one of multiple candidate routes according to the load imposed on the bus, the data transfer latency of the overall chip and the operating frequency of the bus can be reduced. That is why a multi-route control technique that can maximize the performance of the NoC bus is needed.

Japanese Patent Publication No. 3816531 discloses a method for choosing one of multiple data transfer routes according to the status of a bus that connects multiple bus masters together. According to the technique disclosed in Japanese Patent Publication No. 3816531, data is transferred on a frame-by-frame basis from a bus master on the transmitting end to a bus master on the receiving end. If the frame transmitted has been received successfully at the receiving end, acknowledge data is returned. Otherwise, no acknowledge data is returned. Thus, if no acknowledge data is returned, the bus master on the transmitting end senses that the transfer of that frame has failed. In that case, the bus master changes the transfer routes into another one and re-transmits that frame through it. In this manner, communications can be continued. If any error has been detected in the header of the frame received, then the bus master on the receiving end discards that frame, and therefore, the bus master on the transmitting end never receives any acknowledge data in that case. Likewise, if the frame transfer latency on the data transfer route currently chosen is too long for the frame to arrive at the receiving end within a predetermined period of time, the bus master on the transmitting end cannot receive the acknowledge data within the predetermined time. Then, the routes also need to be changed. By changing the data transfer routes dynamically in this manner according to the status of the route currently used, communications can be made through a route with less transfer latency or error.

If the conventional multi-route control technique is adopted, the bus master on the transmitting end needs to choose the best route selfishly so as to optimize its own data transfer status by using the transfer latency and the situation of error generation as evaluation indices.

As a result, the flow rate of the data being transferred through the bus (or link) that connects the bus masters together may vary. This is because as multiple bus masters on the NoC compete with each other to get the best route available, some data transfer route or link resource will be scrambled for by a number of bus masters and data will have to be transferred from multiple different transmitting ends through only a few links.

Such non-uniformity causes the following three problems.

First of all, in a link with a high flow rate, the operational loads on bus controllers at both ends of that link become so heavy that the data transfer latency increases significantly. The latency of the data transfer between bus masters is a decisive factor that determines the operation rates of those bus masters. For example, when data is transferred between a processor and a memory, the memory access latency increases the overall length of wait cycles for the processor, which will lead to a decline in performing performance.

Secondly, the operating frequency of the bus should be increased so as to cope with the link with a high flow rate. However, the higher the operating frequency of the bus, the more difficult it is to control the wiring delay and the crosstalk and the greater the number of design or verification process steps.

Thirdly, the higher the operating frequency of the bus, the greater the power dissipated by a link. The power dissipation P of each of multiple transistors that form a link is represented by the following Equation (1):

$$P = \alpha \cdot C \cdot V^2 \cdot f \quad (1)$$

where α denotes the switching rate, C denotes the capacitance of the circuit, V denotes the supply voltage and f denotes the operating frequency.

Furthermore, by decreasing the operating frequency, the supply voltage can also be reduced as represented by the following Equation (2):

$$V = \frac{C}{(1-\eta)^\gamma} \cdot f^{\frac{1}{\gamma-1}} \quad (2)$$

In Equation (2), η denotes the ratio of the operating threshold voltage of the transistor to the supply voltage and γ denotes a constant that depends on the process rule. For example, if γ=2, a decrease in operating frequency will reduce the power dissipation to the third power. That is why depending on the degree of non-uniformity of the flow rate, the power dissipation of the link that should cope with a high transfer rate could be very large.

SUMMARY OF THE INVENTION

It is therefore an object of the present invention to provide a bus controller that can eliminate such non-uniformity in data flow rate between those links.

A bus controller according to the present invention is arranged between a bus master and a networked communication bus in order to control the transmission route of a packet that flows through the communication bus. The controller includes: a data receiving section for receiving information about output status from other bus controllers, which exist on multiple transmission routes available; a route load detecting section for calculating uniformity of distribution index indicating the degree of non-uniformity in transmission flow rate between the respective transmission routes based on information about the output status; a routing section for determining multiple transmission routes, of which the transmission flow rates have been adjusted by reference to the uniformity of distribution index; a packet assembling section for generating a packet based on data that has been received from the bus master; a data output section for outputting the packet through one of multiple output ports, which are connected to mutually different communication buses; and a header analyzing section for determining which one of the multiple output ports is connected to one of the transmission routes that has been chosen by reference to information about the receiving end of the packet.

The bus controller may further include an output monitoring section for providing information about the data output status of the data output section in response to a request that has been received from the other bus controllers.

The route load detecting section may be notified by the output monitoring section of the output status, which includes at least the average value of the frequencies of occurrence of transfer that are associated with respective priority levels of flows to output, and may calculate the uniformity of distribution index based on that average value.

The route load detecting section may be notified by the output monitoring section of the output status, which includes at least the average and maximum values of the frequencies of occurrence of transfer that are associated with respective priority levels of flows to output, and may calculate the uniformity of distribution index based on the average and maximum values.

The route load detecting section may include a parameter defining the degree of reliability of an estimate that results from a statistical multiplexing effect included in the uniformity of distribution index.

The route load detecting section may adjust the parameter defining the degree of reliability by sensing a deterioration in the transfer status of the packet. Unless the transfer status improves even by adjusting the parameter, the route load detecting section may make a probability-based adjustment on the parameter.

On receiving the request for the information about the output status that has been issued at a predetermined timing, the output monitoring section returns that information.

The route load detecting section may notify the output monitoring section in advance of a condition for sending the information about the output status. The output monitoring section may have been notified in advance of the condition for sending the information about the output status and may be provided with that information if the information sending condition is satisfied.

The route load detecting section may add a weight representing the priority level of flow of each said transmission route to the information about the output status, thereby calculating an estimated transmission flow rate of each said transmission route and then calculating the uniformity of distribution index indicating the degree of non-uniformity in transmission flow rate between the respective transmission routes.

The route load detecting section may calculate a statistical value based on estimated transmission flow rates of the respective transmission routes and may determine, based on the statistical value, whether or not the respective transmission routes have a uniform relation.

The route load detecting section may calculate the uniformity of distribution index indicating the degree of non-uniformity in transmission flow rate between the respective transmission routes based on not only information about the output status but also information about the data properties of the transmission routes to choose one from.

A simulation program according to the present invention is used in a bus controller that is arranged between a bus master and a networked communication bus in order to control the transmission route of a packet that flows through the communication bus. The simulation program is defined so as to make a computer perform the steps of: receiving information about output status from a class of other bus controllers, which are represented as objects on the simulation program and which exist on multiple transmission routes available; calculating uniformity of distribution index indicating the degree of non-uniformity in transmission flow rate between the respective transmission routes based on information about the output status; determining multiple transmission routes, of which the transmission flow rates have been adjusted by reference to the uniformity of distribution index; generating a packet based on data that has been received from a class that is implemented as the bus master; outputting the packet through one of multiple output ports, which are connected to mutually different communication buses; determining which one of the multiple output ports is connected to one of the transmission routes that has been chosen by reference to information about the receiving end of the packet; and outputting the packet through the output port selected.

The bus controller of the present invention monitors the output status with respect to other bus controllers that exist on multiple transmission routes available, and changes the data transmission routes based on the uniformity of distribution index indicating the degree of non-uniformity in transmission flow rate between the respective transmission routes. Thus, the degree of non-uniformity in flow rate between the links that form an NoC bus can be reduced automatically. As a result, the data transfer load can be distributed more uniformly over the entire bus. Consequently, an increase in communication delay or latency, which would otherwise be caused by an excessively heavy traffic on a particular link, can be minimized.

In addition, since the operating frequencies of the links can be lowered, the bus can be designed more easily and the power dissipation of the bus while data is being transferred can be cut down. Optionally, by combining this technique with a technique for dynamically controlling the operating frequencies of the links, the power dissipation of the bus can be cut down even more efficiently.

On top of that, by making the route loads on other bus masters that have a similar function more uniform in view of the statistical multiplexing effect, the loads on those bus masters can be distributed more uniformly as well. That is why by applying the present invention to a distributed memory architecture, a bottleneck that would otherwise be caused by excessive access can be avoided with a sufficient degree of reliability ensured in terms of allowable memory access latency.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 18 shows the flow of processing to be performed by the route load detecting section 101.

FIG. 19 shows an example of the table of routes to be managed by the routing section 102 of the bus controller R21.

DETAILED DESCRIPTION OF PREFERRED EMBODIMENTS

Hereinafter, preferred embodiments of a bus controller according to the present invention will be described with reference to the accompanying drawings.

(Embodiment 1)

Before a bus controller as a first preferred embodiment of the present invention is described in detail, a so-called "NoC (Network on Chip)" communication bus, transmission routes that can be used on the communication bus, and the data transfer rates of the respective transmission routes will be described. In addition, it will also be described how in principle the bus controller of this preferred embodiment operates.

Figure 1:
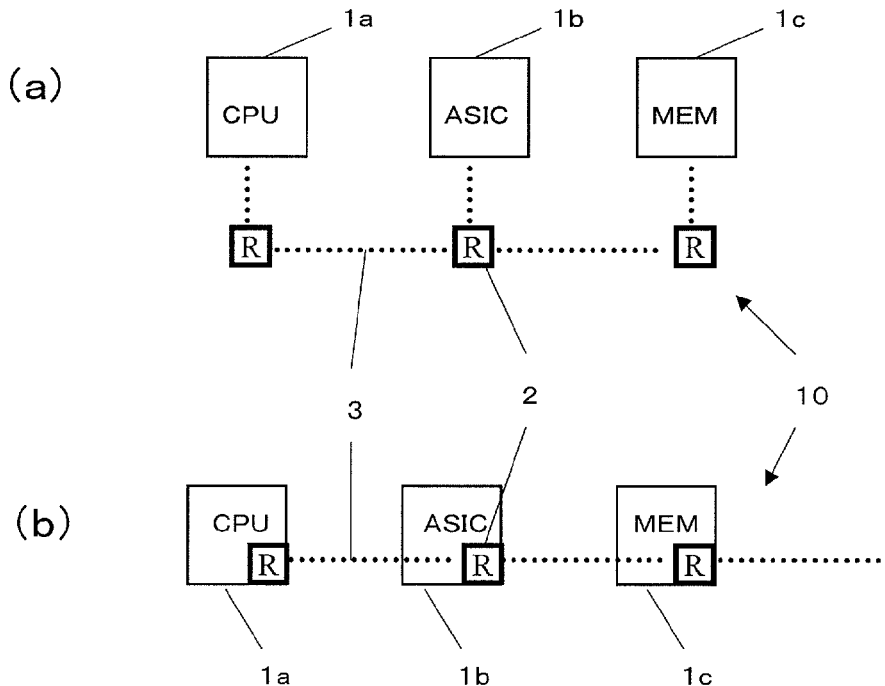
FIG. 1(a) illustrates an exemplary hardware connection and FIG. 1(b) is a schematic representation thereof.
Figure 2:
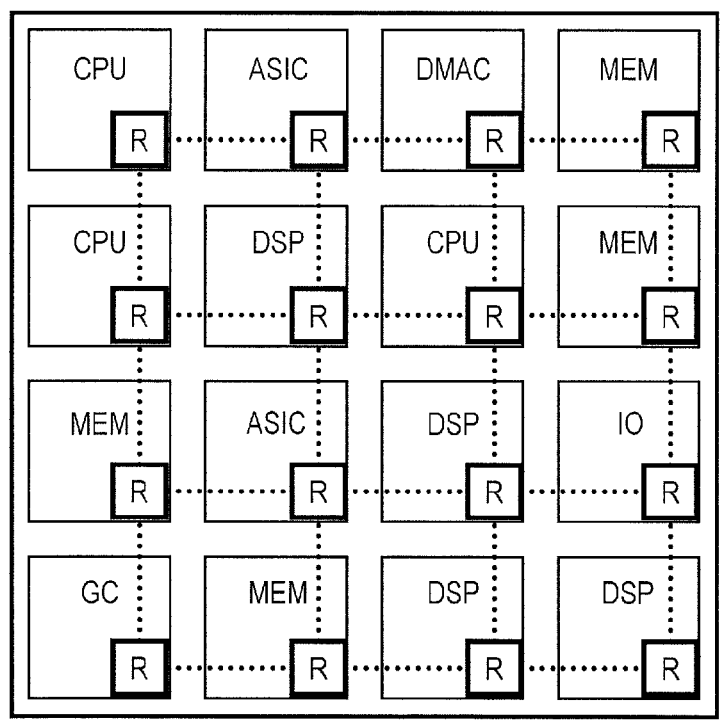
FIG. 2 illustrates an exemplary configuration for an NoC bus for coupling together a number of bus masters that form a two-dimensional mesh.
Figure 3:
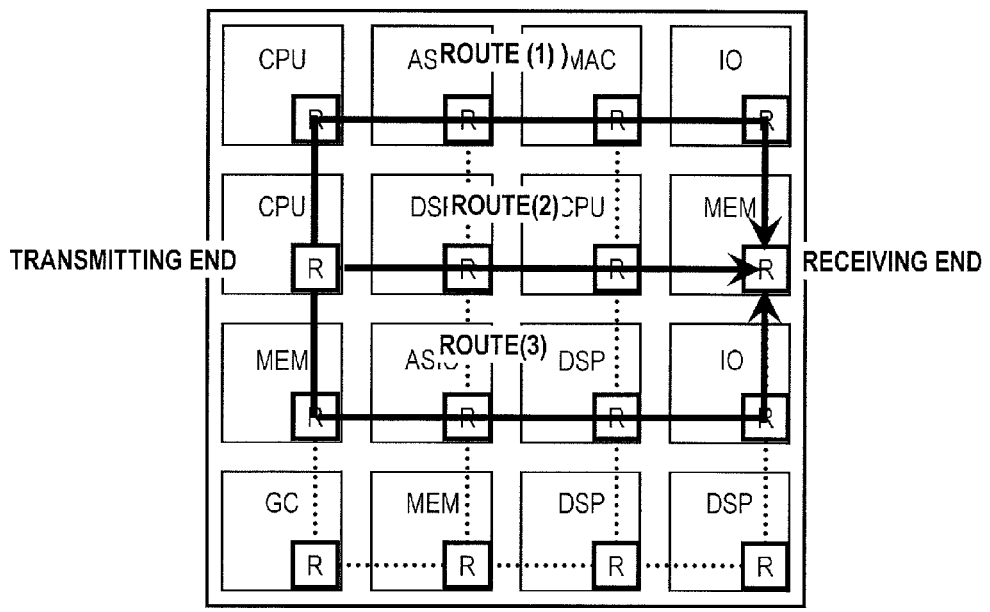
FIG. 3 illustrates three routes (1), (2) and (3) leading from the transmitting end to the receiving end.
Figure 4:
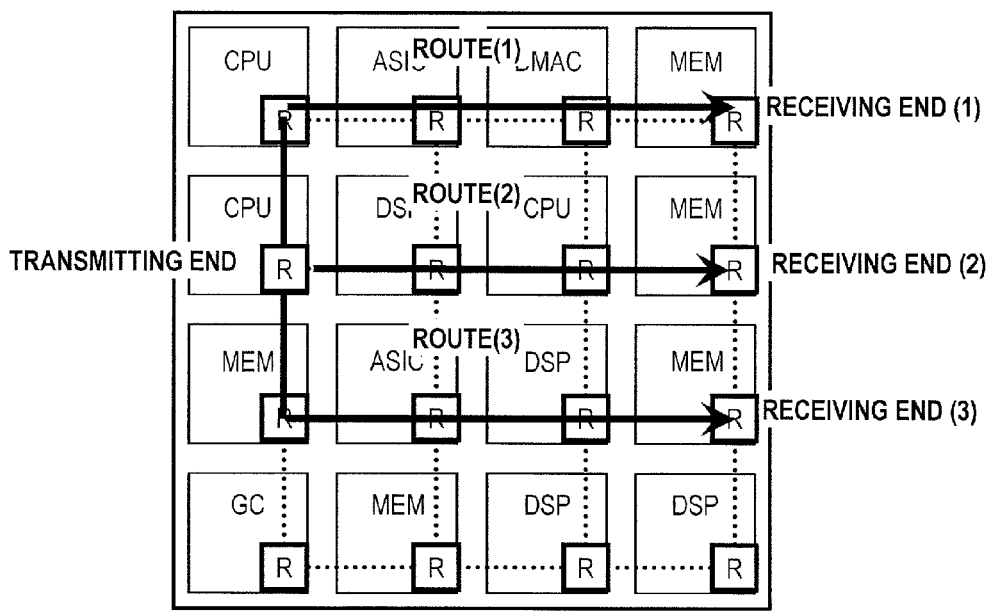
FIG. 4 illustrates three routes leading from one transmitting end to three different receiving ends (1), (2) and (3).
Figure 5:
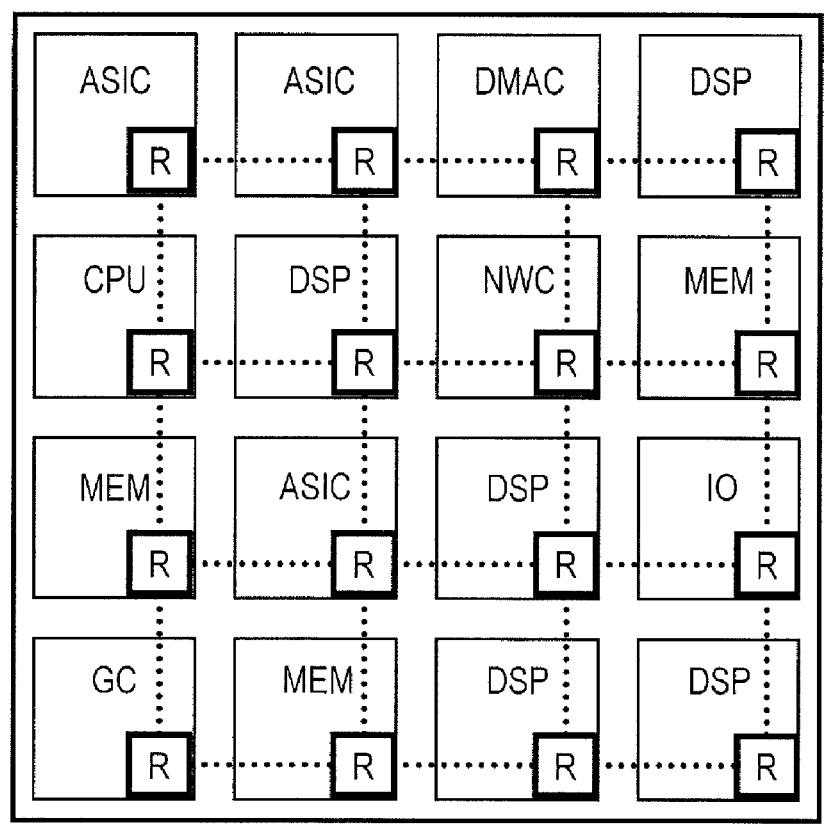
FIG. 5 illustrates how a system on chip semiconductor LSI to be built in cellphone terminals, for example, may be formed using an NoC bus.

FIG. 5 illustrates how a system on chip semiconductor LSI to be built in cellphone terminals, for example, may be formed using an NoC bus. This drawing is also illustrated in the same format as FIG. 1(b). Although a bus controller R is connected one to one to each single bus master in FIG. 5, some bus controllers may just perform a relay function without being connected to any bus master.

If each bus controller R is connected to its associated bus master, each bus master is given a non-ambiguous address. On the other hand, if not every bus controller is connected to its associated bus master, then each bus controller may be given a virtual non-ambiguous address. In both cases, those addresses will be referred to herein as "bus master addresses".

Figure 6:
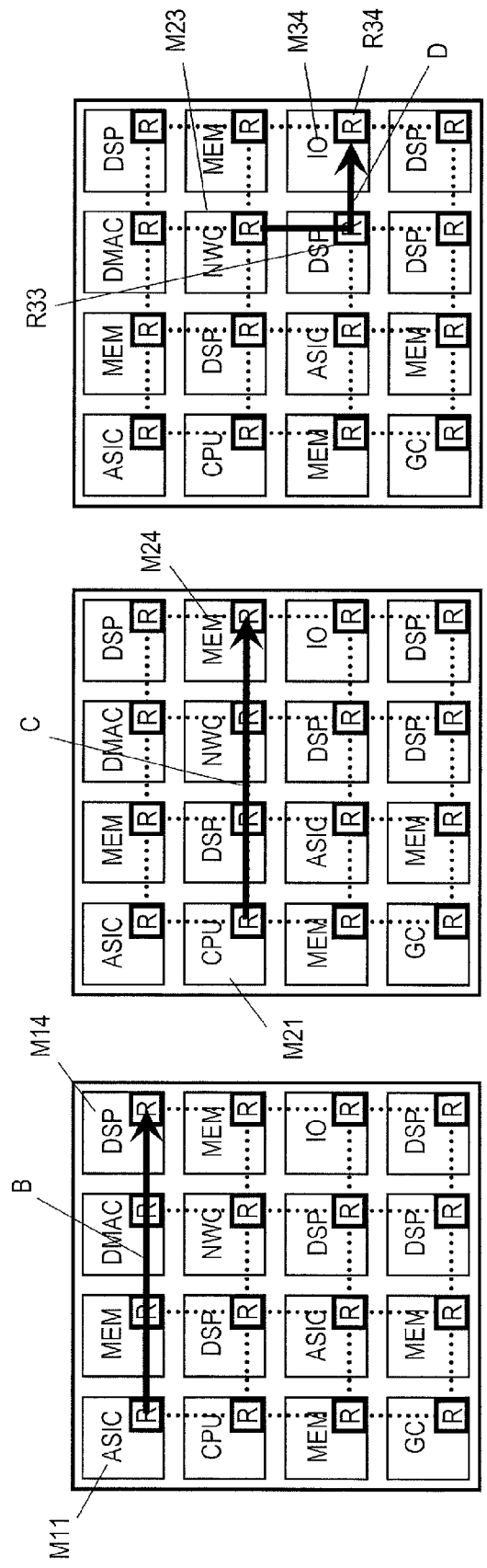
FIG. 6A illustrates a data transfer route in a one-segment telecast viewing application.
FIG. 6B illustrates a data transfer route for a network communication sled on a full browser for cellphones.
FIG. 6C illustrates a data transfer route through which a client program of an on-line game communicates with a server at a distant location.

A cellphone terminal would be a typical example that is required to have multiple functions including not only its original voice speech function but also email delivery, Web browsing, one-segment telecast viewing and on-line game functions. FIG. 6A illustrates a data transfer route in a one-segment telecast viewing application. A data transfer process B from a bus master M11 on the transmitting end to a bus master M14 on the receiving end is carried out through the route that is indicated by the arrow in FIG. 6A. On the other hand, FIG. 6B illustrates a data transfer route for a network communication sled on a full browser for cellphones. In this case, a data transfer process C from a bus master M21 on the transmitting end to a bus master M24 on the receiving end is carried out through the route that is indicated by the arrow in FIG. 6B. Furthermore, FIG. 6C illustrates a data transfer route through which a client program of an on-line game communicates with a server at a distant location. In this case, a data transfer process D from a bus master M23 on the transmitting end to a bus master M34 on the receiving end is carried out through the route that is indicated by the arrow in FIG. 6C.

The data transfer processes B, C and D shown in FIGS. 6A, 6B and 6C are carried out in parallel with each other by a multi-sled type OS or a parallel-processing hardware components.

Figure 7:
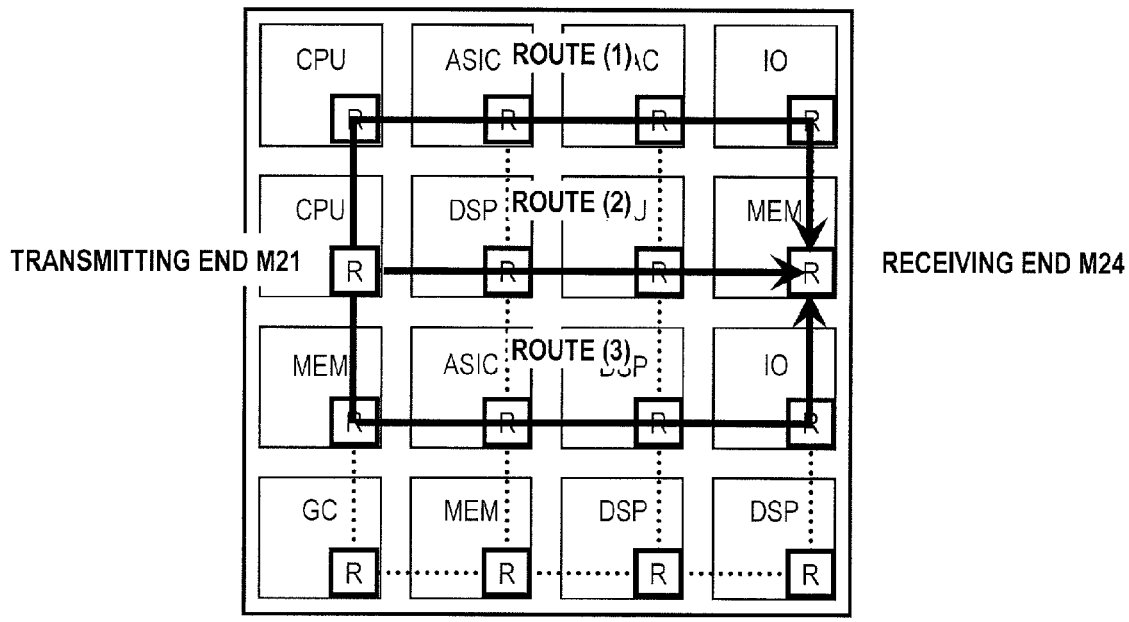
FIG. 7 shows that when data is transferred from the transmitting end M21 to the receiving end M24, three routes are defined as candidates.

FIG. 7 shows that when data is transferred from the transmitting end M21 to the receiving end M24, three routes are defined as candidates. In the following description, those three candidate routes will be referred to herein as routes (1), (2) and (3), respectively.

Figure 8:
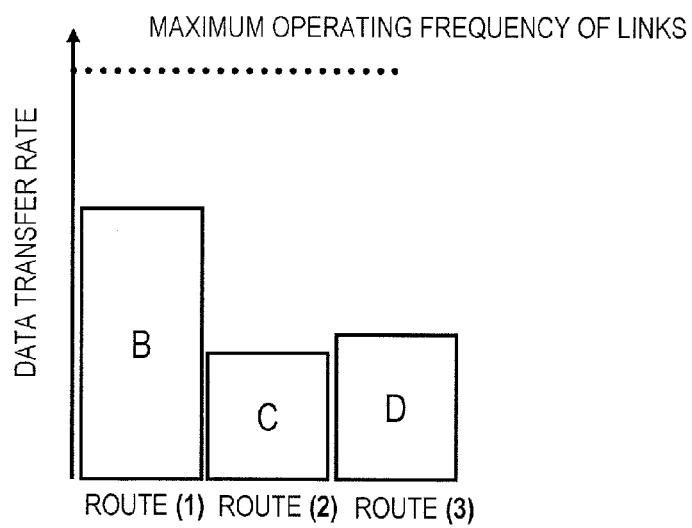
FIG. 8 shows data transfer rates on respective candidate routes between the bus masters M21 and M24 in a situation where the data transfer processes B, C and D are carried out concurrently.

FIG. 8 shows data transfer rates on respective candidate routes between the bus masters M21 and M24 in a situation where the data transfer processes B, C and D are carried out concurrently. The data transfer rate on each route may be represented by the maximum value of the data transfer rates of respective links on that route. For example, if the data transfer rate of the link between the bus controllers R33 and R34 shown in FIG. 6C is higher than that of any other link on the route (3), then the data transfer rate of the link between the bus controllers R33 and R34 is defined to be the data transfer rate of the route (3).

Figure 9:
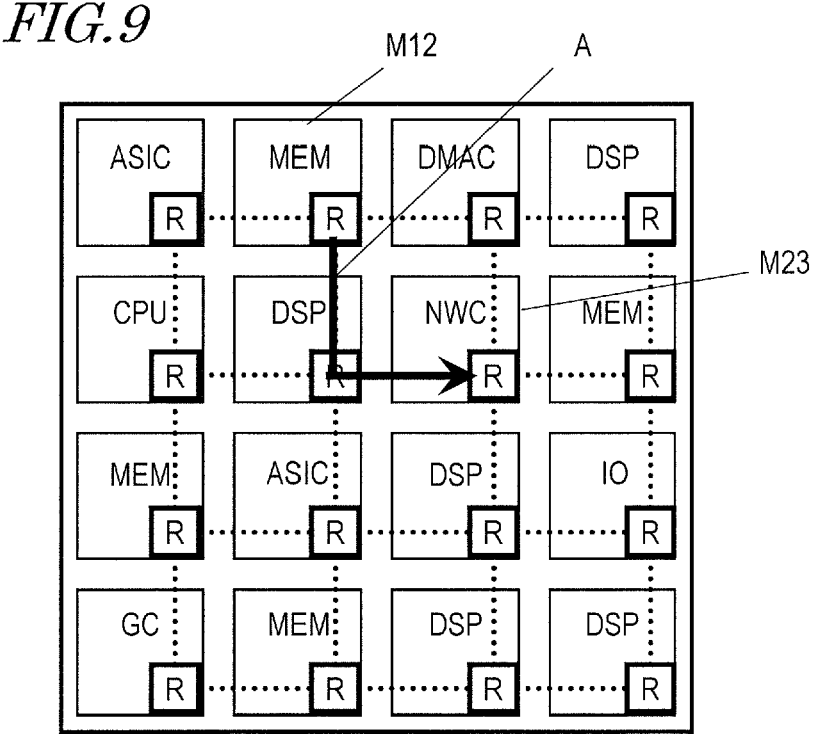
FIG. 9 illustrates a data transfer route to follow when a moving picture is played back.

Suppose the user has operated a full-browser application on the screen of his or her cellphone to access a moving picture site and has instructed that a moving picture content be played back. In accordance with that instruction, a moving picture playback sled is started. FIG. 9 illustrates a data transfer route to follow when a moving picture is played back. As shown in FIG. 9, a data transfer process A from the bus master M12 on the transmitting end to the bus master M23 on the receiving end is started along the route indicated by the arrow.

Suppose the data transfer process A needs to be started as an additional process in a situation where the data transfer processes B, C and D shown in FIG. 8 are already being carried out.

Figure 10:
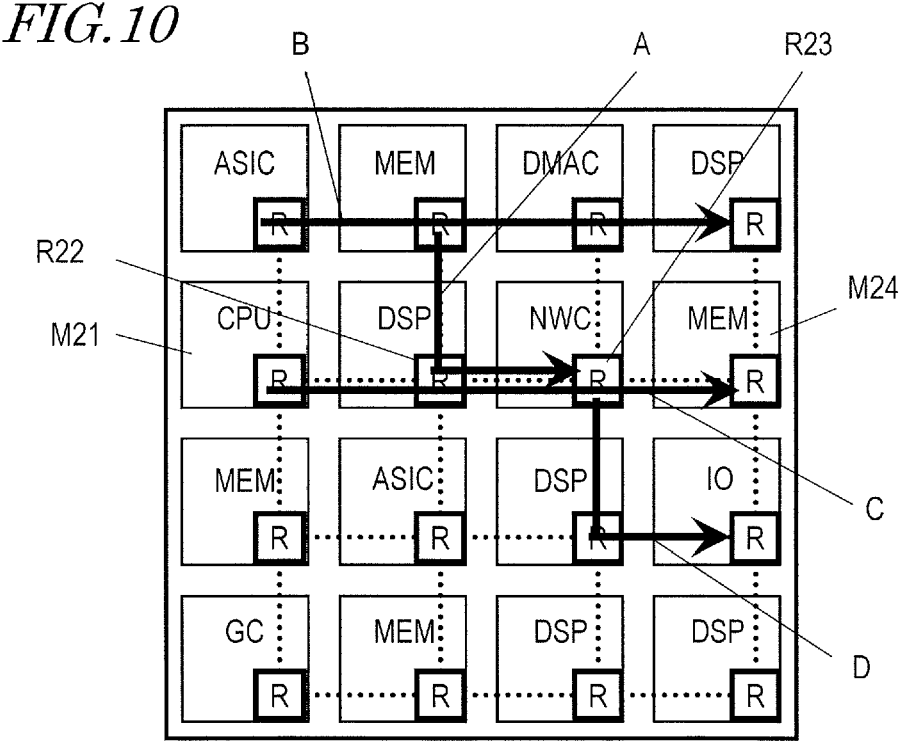
FIG. 10 illustrates a situation where multiple data transfer processes are carried out concurrently on the same chip.
Figure 11:
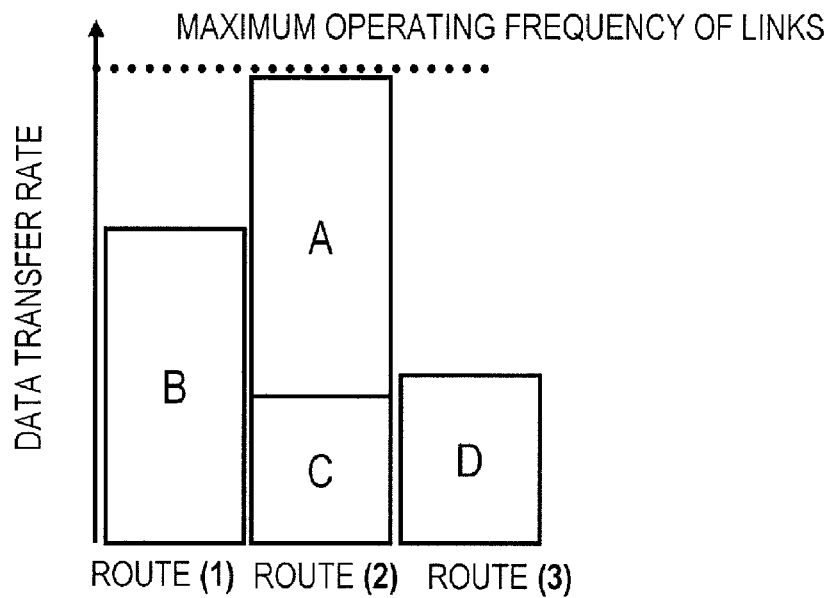
FIG. 11 shows a situation where the data transfer process A is newly added to the ones shown in FIG. 8.

FIG. 10 illustrates such a situation where multiple data transfer processes are carried out concurrently on the same chip. On the other hand, FIG. 11 shows a situation where the data transfer process A is newly added to the ones shown in FIG. 8. In FIG. 11, the route (2) with the lowest data transfer rate in FIG. 8 is chosen as the data transfer route for a moving picture playback sled.

However, in the link between the bus controllers R22 and R23, the data transfer processes A and C compete with each other as shown in FIG. 10. Thus, in the link between the bus controllers R22 and R23, the two data transfer processes A and C are treated as parallel ones. That is why since the data transfer rate rises there, the operating frequency has to be increased. As a result, the data transfer rate becomes non-uniform among the three routes as shown in FIG. 11. If the operating frequency of a link has the level indicated by the dotted line in FIG. 11, then the route (2) has a heavy load state and a lot of energy is consumed by that link.

Figure 12:
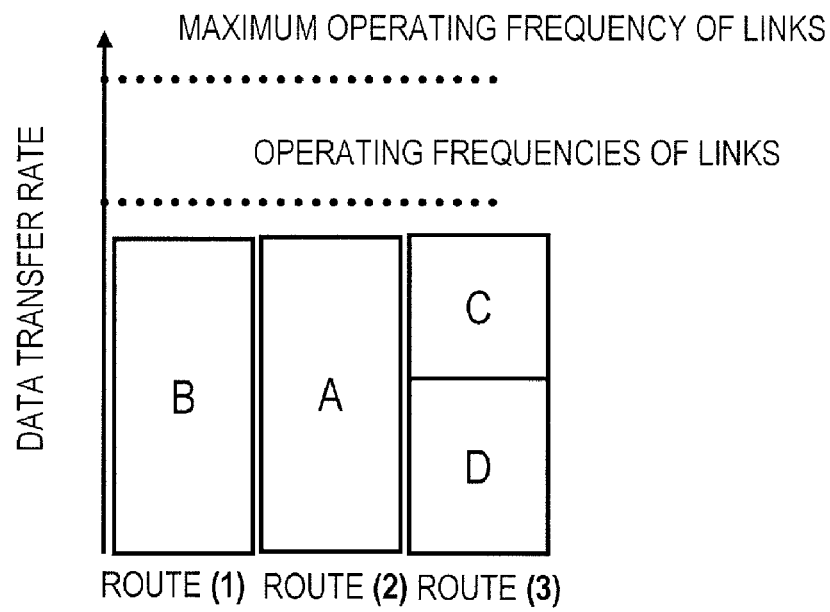
FIG. 12 shows a result of the data transfer rate adjustment according to the first preferred embodiment.

Thus, to overcome such a problem, according to this preferred embodiment, the data transfer rates are adjusted so that multiple routes have a uniform data transfer rate. FIG. 12 shows a result of the data transfer rate adjustment according to this preferred embodiment. As shown in FIG. 12, by controlling and making more uniform the data transfer rates of the three routes, data can be transferred at lower operating frequencies and the power dissipation can be cut down, too.

Figure 13:
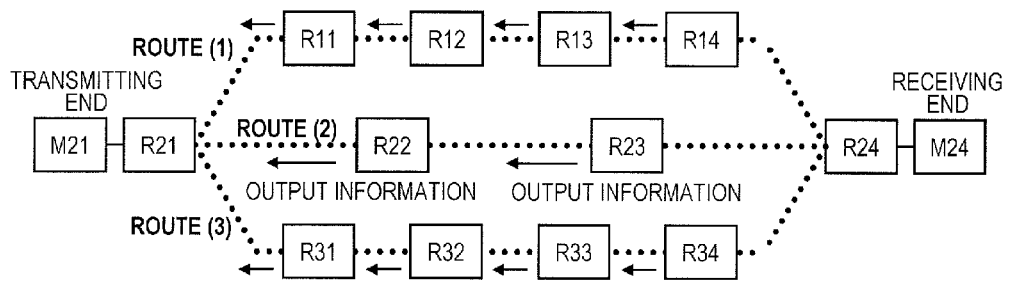
FIG. 13 illustrates a partial route diagram showing exactly how the system should operate in order to eliminate the non-uniformity in route flow rate between the links and to distribute the data transfer rates more uniformly.

FIG. 13 illustrates a partial route diagram showing exactly how the system should operate in order to eliminate the non-uniformity in route flow rate between the links and to distribute the data transfer rates more uniformly. For the sake of simplicity, only a part of FIG. 10 is shown in FIG. 13. The overall configuration of the system on chip semiconductor LSI is just as shown in FIG. 10. That is to say, the lines, bus masters and bus controllers that are not shown in FIG. 13 are just omitted and do exist as shown in FIG. 10.

The bus controller R21 that is connected to the bus master M21 on the transmitting end checks out the route-load status of three routes (1), (2) and (3) that have been defined in advance with respect to the bus master M24 on the receiving end that is the destination of this data transfer. The route-load status can be checked out by collecting the output information that is managed by the respective bus controllers. When the output information of each and every route has been collected, the bus controller R21 will calculate the estimated flow rates of the respective routes and compare them to each other, thereby rating the degrees of uniformity between the routes. If there is significant non-uniformity between those routes, then the bus controller R21 changes the data transfer routes into the route with the highest degree of uniformity, thereby eliminating non-uniformity from the data transfer and distributing the transferred data over the entire bus uniformly.

Hereinafter, an exemplary configuration for a bus controller that performs this operation will be described with reference to FIG. 14.

Figure 14:
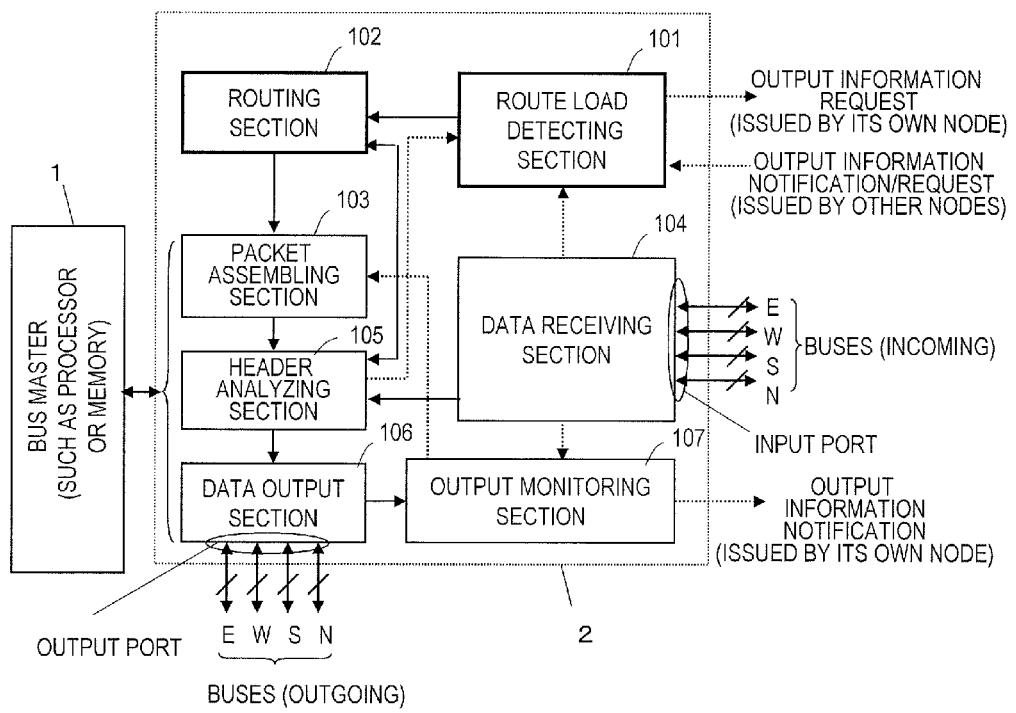
FIG. 14 illustrates a configuration for a bus controller 2 according to a preferred embodiment of the present invention.

FIG. 14 illustrates a configuration for the bus controller 2 of this preferred embodiment.

The bus controller 2 includes a route load detecting section 101, a routing section 102, a packet assembling section 103, a data receiving section 104, a header analyzing section 105, a data output section 106, and an output monitoring section 107. Hereinafter, the functions of respective components will be described one by one.

Packet Assembling Section 103

On the networked NoC bus, data is supposed to be transferred on a packet basis. The Packet assembling section 103 makes a packet based on the data that has been received from the bus master that is connected to itself.

Figure 15:
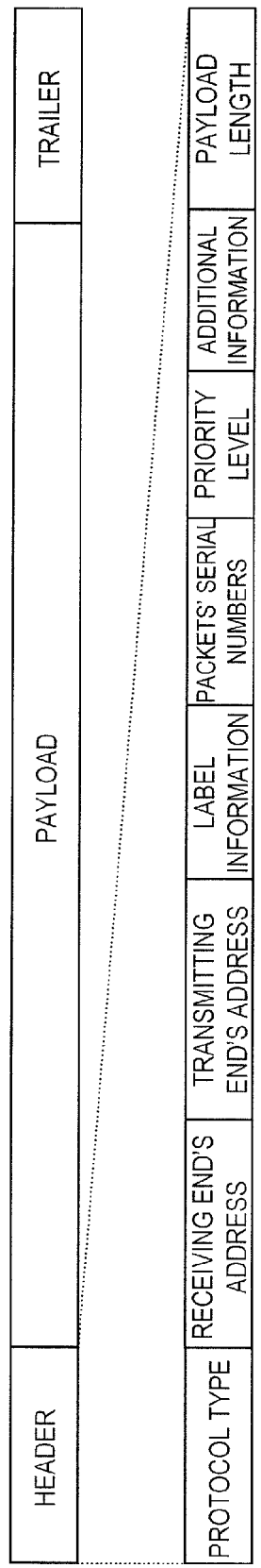
FIG. 15 illustrates an exemplary makeup of a packet.

FIG. 15 illustrates the makeup of a packet. As shown in FIG. 15, the packet is made up of a header, a payload, which is the substance of data to be exchanged between bus masters, and a trailer to store an error correction code, for example. However, the payload and the trailer are not indispensable.

The header may include the following pieces of information, none of which are indispensable but the address of the bus master on the receiving end:
type of protocol,
addresses given to the bus master and bus controller on the receiving end,
addresses given to the bus master and bus controller on the transmitting end,
label information allocated to a group of packets that either belong to the same application or share the same object,
packet serial numbers, which are number information to be allocated non-ambiguously to a group of packets with the same label information in the order of time of transmission,
priority levels representing the permitted levels of latency of packets being transferred,
additional information, and
information indicating whether or not a payload follows and a payload length indicating the length of that payload.

It should be noted that the protocol type is an identification code indicating whether the packet is going to be sent to transfer data between bus masters, or to request output information to detect a route load, or to provide the output information. In the following description, those three types of packets will be referred to herein as a "transfer data packet", an "output information request packet" and an "output information notification packet", respectively.

In response to a data transfer request that has been received from the bus master that is connected to itself, the Packet assembling section 103 makes a transfer data packet compliant with the format shown in FIG. 15 and sends the packet to the header analyzing section 105.

Also, in response to an output information collect request that has been received from the route load detecting section 101, the Packet assembling section 103 makes an output information request packet compliant with the format shown in FIG. 15 and sends the packet to the header analyzing section 105. Furthermore, in response to an output information notification request that has been received from the output monitoring section 107, the Packet assembling section 103 makes an output information notification packet compliant with the format shown in FIG. 15 and sends the packet to the header analyzing section 105.

Data Receiving Section 104

The data receiving section 104 receives a transfer data packet and/or an output information notification packet through input link(s) connected to itself and then passes the packet(s) to the header analyzing section 105. Although four input ports E, W, S and N are illustrated in FIG. 14, any other number of input ports may be provided as long as there is at least one input port. These input ports are connected to the respective output ports of multiple different bus controllers.

Header Analyzing Section 105

The header analyzing section 105 checks out the protocol type of the packet that has been passed by the data receiving section 104, thereby determining the packet type, which is supposed to be a transfer data packet, an output information request packet or an output information notification packet according to this preferred embodiment.

If the packet type turns out to be a transfer data packet, the header analyzing section 105 checks out an address indicating the bus master on the receiving end (which will be referred to herein as a "receiving-end address"). And if the receiving end of the packet has turned out to be the bus master that is connected to itself, then the header analyzing section 105 extracts the payload portion and sends it to the bus master. Otherwise, the header analyzing section 105 presents the address of the bus master on the receiving end to the routing section 102, thereby determining which output port the packet should be output through.

Next, if the packet type turns out to be an output request packet, the header analyzing section 105 also checks out the receiving-end address. And if the receiving end of the packet has turned out to be the bus master that is connected to itself, then the header analyzing section 105 requests the output monitoring section 107 to provide the output information and presents the bus master address of the transmitting end (which will be referred to herein as a "transmitting-end address") that has been stored in the packet header. Otherwise, the header analyzing section 105 presents the address of the bus master on the receiving end to the routing section 102, thereby receiving a notification of the output port to output the packet through. In this manner, the header analyzing section 105 chooses an output port. Optionally, if the Packet assembling section 103 has received a list of candidate routes and a hop list from the routing section 102, an output port to output the packet through may also be chosen based on those lists.

On the other hand, if the packet type turns out to be an output information notification packet, the header analyzing section 105 also checks out an address indicating the bus master on the receiving end. And if the receiving end of the packet has turned out to be the bus master that is connected to itself, then the header analyzing section 105 sends the address indicating the bus master on the transmitting end, which is stored in the packet header, and the output information, which is stored in the payload, to the route load detecting section 101. Otherwise, the header analyzing section 105 presents the address of the bus master on the receiving end to the routing section 102, thereby determining that the packet be output through the output port specified by the routing section 102.

Data Output Section 106

The data output section 106 changes the lines so as to output the packet through the output port that has been specified by the header analyzing section 105 and sends out the packet as a signal through the bus. Also, if the data transfer packet cannot be sent out immediately due to a competition for a particular route, then the data output section 106 delays the transfer of a data transfer packet of a low priority, thereby sending out data transfer packets one after another according to their order of priority.

Output Monitoring Section 107

In response to the output information notification request that has been received from the header analyzing section 105, the output monitoring section 107 monitors the status of each output port of the data output section 106. Multiple data transfer packets that have been sent out by multiple bus masters are output through each output port as a mixture. However, if multiple data transfer packets share the same piece of label information, then those packets can be determined to belong to the same flow.

In this description, the "flow" refers herein to a group of data transfer packets that are sent from a bus master on the transmitting end to a bus master on the receiving end in order to achieve the same object (e.g., to carry out the same application or the same task). The permitted latency varies from one flow to another. And the permitted level of latency that is required by a flow is indicated by the priority level that is stored in the header of a packet. Specifically, the priority level should be high in signal processing applications that require real time processing but could be low in file transfer applications to be performed as a background process.

The priority level may be fixed on an application basis, or may be changed from one of multiple sleds that form one application to another, or may even be changed on the basis of an even smaller processing unit that is determined by a programmer or a complier. Normally, the transmission rates of respective flows are not constant but vary from one flow to another. Furthermore, even the same flow will usually have a transmission rate that varies with time.

Figures 16, 17:
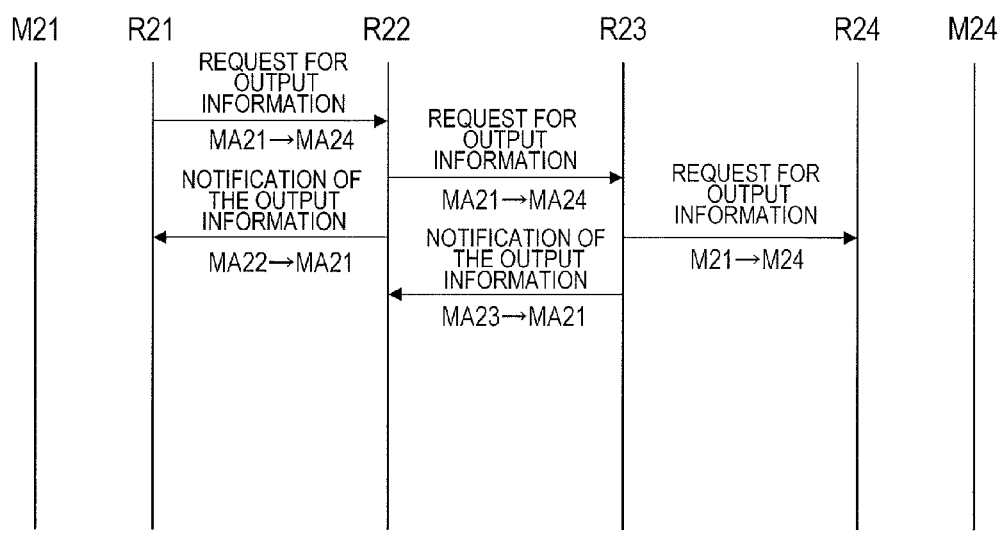
FIG. 16 shows examples of information to be described on the payload of an output information notification packet.
FIG. 17 illustrates an exemplary protocol to use in a situation where the bus controller R21 collects output information on the route (2) that leads to the bus master M24.

FIG. 16 shows examples of information to be described on the payload of an output information notification packet. On receiving an output information request packet, which is addressed to itself, from another bus controller, the output monitoring section 107 generates the information shown in FIG. 16 with respect to the output port in question, and notifies the bus controller on the transmitting end of that information. The output information is made up of multiple entries, each of which is associated with a priority level of the packet. That is to say, with respect to each level of priority, the average with time and maximum and minimum values of the numbers of bus cycles of the output ports that were needed to send a packet of that priority level are reported.

According to this preferred embodiment, even if multiple flows of the same priority level competed with each other on the same output port, those flows would not be particularly distinguished from each other. Optionally, however, monitoring could also be carried out more closely on a flow-by-flow basis. Also, the output port information reported may be either calculated based on the values actually measured by the output monitoring section 107 as described for this preferred embodiment or based on the flow specifications that are provided as additional information by the bus master.

FIG. 17 illustrates an exemplary protocol to use in a situation where the bus controller R21 collects output information on the route (2) that leads to the bus master M24. In FIG. 17, "MA" denotes the unique address that has been given to each bus master on the NoC. The bus controller can also be identified by that address.

The output information request packet that has been sent out onto the route (2) by the bus controller R21 on the transmitting end passes through the bus controllers R22 and R23 on the route (2) and then is forwarded to the bus controller R24 in the vicinity of the terminal of the route. The bus controllers R22 and R23 not only return an output information notification packet about an output port that is connected to the link of the bus controller on the next stage on the route (2) but also forward an output information request packet to the bus controller on the next stage on the route (2). The bus controller R24 in the vicinity of the terminal of the route discards the output information request packet.

Route Load Detecting Section 101

The route load detecting section 101 sends out an output information request packet onto every candidate transmission route by reference to the information about the address of the receiving end and the candidate transmission route with respect to each flow that has been sent out by the bus master that is connected to itself. The output information request packet may be sent out at regular intervals. Alternatively, the route load detecting section 101 may also adopt a trap method in which by storing a condition for returning an output information notification packet in an output information request packet, the output information notification packet is returned only when each bus controller on the route satisfies that returning condition. In that case, the returning condition may be a variation in the number of cycles occupied by data transfer packets that has exceeded a predetermined threshold value.

Hereinafter, a situation where the route load detecting section 101 of the bus controller R21 sends out an output information request packet onto the routes (1), (2) and (3) on a regular basis will be described with reference to FIG. 13. In that case, each bus controller on each route returns an output information notification packet to the bus controller R21 in accordance with the protocol shown in FIG. 17. Thus, the bus controller R21 can collect the output information $\omega_{ij}$ shown in FIG. 16 from the $j^{th}$ bus controller on the $i^{th}$ route with respect to each priority level $\delta$:

$$\vec{\omega}_{ij} = \begin{vmatrix} \omega_{ij}^{ave} \\ \omega_{ij}^{max} \\ \omega_{ij}^{min} \end{vmatrix} \tag{3}$$

Suppose a weight coefficient matrix is represented by P and each element of the matrix by $p_{ij}$. In that case, each row of P corresponds to an associated element of the output information vector $\omega_{ij}$ and each column thereof corresponds to the priority level $\delta$. As average with time, maximum value and minimum value are collected as three different kinds of information according to this preferred embodiment, the number of rows of P is three. Also, as the flows are classified into three groups that have high, medium and low priority levels, respectively, the number of columns of P is also three:

$$P = \begin{vmatrix} p_{11} & p_{12} & p_{13} \\ p_{21} & p_{22} & p_{23} \\ p_{31} & p_{32} & p_{33} \end{vmatrix} \tag{4}$$

In that case, the estimated flow rate $\beta_{ij}$ of the $j^{th}$ link on the $i^{th}$ route is calculated by the following Equation (5):

$$\beta_{ij} = \vec{\omega}_{ij}{}^T P \vec{e} \tag{5}$$

where e represents a vector, of which every element is one.

The estimated flow rate $\beta_i$ of the $i^{th}$ route may be defined as the maximum value of the estimated flow rates of various links on that route:

$$\beta_i = \max_j \{\beta_{ij}\} \qquad (6)$$

By adjusting the elements of the weight coefficient matrix, the route load detecting section 101 can estimate the flow rate of each route appropriately. Then, the route load detecting section 101 controls the flow route so as to make the estimated flow rates more uniform. As a result, the data transfer rates can be distributed more uniformly over the entire bus, the operating frequency of the bus can be lowered, and the power dissipation can be cut down.

Optionally, if the property of the flow sent out by each bus master can be presumed to be just as designed in advance, then the route load detecting section 101 may determine the respective coefficient values of the weight coefficient matrix based on that information. For example, if it were known in advance that each bus master would generate only a flow that never changes with time, then the average, maximum and minimum values of each flow should agree with each other, and therefore, only the average should be reflected on the estimated flow rate. In that case, the weight coefficient matrix P could be defined by the following Equation (7):

$$P = \begin{vmatrix} 1 & 1 & 1 \\ 0 & 0 & 0 \\ 0 & 0 & 0 \end{vmatrix} \qquad (7)$$

However, as each flow will usually have a property that varies with time, the flow rates of respective routes cannot be compared just by comparing their average values to each other. In addition, the flow rate needs to be estimated with the priority levels of respective flows taken into account appropriately so as to prevent a flow with a low priority level from interfering with a flow with a high priority level. The following Equation (8) is an example of a weight coefficient matrix P that also takes such a variation in flow with time into consideration:

$$P = \begin{vmatrix} 0 & 4/6 & 1 \\ 1 & 1/6 & 0 \\ 0 & 1/6 & 0 \end{vmatrix} \qquad (8)$$

If the weight coefficient matrix represented by Equation (8) is adopted, the estimated flow rate $\beta_i$ of the $i^{th}$ route can be calculated by the following Equation (9) with Equations (5) and (6) modified:

$$\beta_i = \sum_{\delta > \delta_{self}} \omega_i^{max} + \sum_{\delta = \delta_{self}} \left( \frac{4}{6} \cdot \omega_i^{ave} + \frac{1}{6} \cdot \omega_i^{max} + \frac{1}{6} \cdot \omega_i^{min} \right) + \sum_{\delta < \delta_{self}} \omega_i^{ave} \qquad (9)$$

where $\delta_{self}$ represents the priority level of the flow to be controlled.

With the weight coefficient matrix defined by Equation (8), the flow rate of a flow that has a higher priority level than its own is estimated by the route load detecting section 101 based on the maximum value of its property that varies with time as can be seen from Equation (9). Also, with this weight coefficient matrix, the average of a flow that has a lower priority level than that of the flow to be controlled is estimated in accordance with the control of the priority level by the data output section 106. Furthermore, with this weight coefficient matrix, the modal value of a flow that has the same priority level as its own is estimated on the supposition that the property that varies with time follows the beta distribution. It should be noted that Equations (7) and (8) never limit the method for defining the weight coefficient matrix. Rather the best P may be defined according to the presumed flow property.

Optionally, a threshold value may be introduced as an index for determining whether or not there is a sufficient degree of uniformity between the three candidate routes. For example, such a decision by a threshold value may be made by using the statistical value ρ given by the following Equation (10):

$$\rho = \left( \sum_{k=1}^{R} \beta_i \right)^2 \bigg/ \left( R \cdot \sum_{k=1}^{R} \beta_i^2 \right) \qquad (10)$$

where R represents the number of candidate routes.

If the ρ value is less than the threshold value ρ th that has been defined in advance, then the route load detecting section 101 may determine that the degree of uniformity between the routes has decreased. In that case, the route load detecting section 101 calculates how much the virtual ρ values would be if the flow to be controlled shifted to each of various candidate routes other than the transmission route through which the data transfer packet is currently being transmitted. Then, the route load detecting section 101 compares those virtual ρ values calculated to each other, chooses a candidate route with the largest ρ value as the new route to take, and presents that route to the routing section 102, thereby updating the table of routes and changing the routes.

FIG. 18 shows the flow of such processing to be performed by the route load detecting section 101.

First of all, in Step S1, the route load detecting section 101 starts an automatic route changing process.

Specifically, the route load detecting section 101 sends out in Step S2 an output information request packet to every candidate transmission route, thereby collecting output information about that candidate transmission route from each relay router on that route.

Next, in Steps S3 through S5, processing is carried out on each route. Specifically, in Step S4, the route load detecting section 101 calculates the estimated flow rate $\beta_i$ of each route.

Thereafter, in Step S6, the route load detecting section 101 calculates uniformity of distribution index ρ between the routes. Then, in the next processing step S7, the route load detecting section 101 determines whether or not the uniformity of distribution index ρ is less than the predefined threshold value ρ th. If the answer is YES, the route load detecting section 101 determines that the degree of uniformity have decreased and the routes be changed. In that case, the process advances to Step S8. On the other hand, if the answer is NO, then the process advances to Step S11, in which the process ends without changing the routes at that point in time.

In Step S8, the route load detecting section 101 calculates the values of virtual uniformly of distribution indices ρ on the supposition that its own flow has shifted to each of those candidate routes and compares them to each other. Next, in Step S9, the route load detecting section 101 chooses the candidate route with the largest ρ value as the new route to take. As a result, the route load detecting section 101 issues in the next processing step S10 a request for processing with respect to the routing section.

And when the processing step S11 is finished, the route load detecting section 101 performs the same series of processing steps that begins with Step S1 all over again.

The uniformity of distribution index ρ is calculated based on the estimated flow rate β that is weighted with the priority level taken into account. And if it has been determined, by reference to that index ρ, that the degree of uniformity has decreased, the routes are changed appropriately. In this manner, non-uniformity can be eliminated from data transfer.

Optionally, by sensing that the uniformity control is not working by monitoring the ratio of the sum of the periods of time in which the ρ value, representing the degree of uniformity between the candidate transmission routes, is less than the threshold value to the overall time, a feedback control may be performed on each element of the weight coefficient matrix P.

Routing Section 102

The routing section 102 manages the table of routes, searches the table of routes with the address of the receiving end specified by the Packet assembling section 103, and notifies the Packet assembling section 103 of the output port that is associated with the bus controller to be the next hop.

FIG. 19 shows an example of the table of routes to be managed by the routing section 102 of the bus controller R21. Three routes are defined as candidates leading to the bus master MA24 that is located at the address of the receiving end. On this table, recorded and managed are the address of the bus controller to be the next hop for each of these three candidate routes, its associated output port, a list of the addresses of bus controllers to hop until the destination address is reached, and selection information indicating the routes through which data transfer packets are actually transmitted.

In response to a request from the route load detecting section 101, the routing section 102 presents the list of the addresses of the receiving ends, the list of candidate routes, and the hop list and also provides information about the route to send the output information request packet. Also, in accordance with the information about the new route to take that has been provided by the route load detecting section 101, the routing section 102 updates the selection information on the table of routes, thereby changing the routes to send the data transfer packet through.

The bus controller 2 described above can automatically reduce the degree of non-uniformity in flow rate between the links that form an NoC bus. As a result, the data transfer load can be distributed more uniformly over the entire bus, and therefore, an increase in communication delay or latency, which would otherwise be caused by an excessively heavy traffic on a particular link, can be minimized. In addition, since the operating frequencies of the links can be lowered, the bus can be designed more easily and the power dissipation of the bus while data is being transferred can be cut down. Optionally, by combining this technique with a technique for dynamically controlling the operating frequencies of the links, the power dissipation of the bus can be cut down even more efficiently. On top of that, by making the route loads on other bus masters that have a similar function more uniform in view of the statistical multiplexing effect, the loads on those bus masters can be distributed more uniformly as well. That is why by applying the present invention to a distributed memory architecture, a bottleneck that would otherwise be caused by excessive access can be avoided with a sufficient degree of reliability ensured in terms of allowable memory access latency.

(Embodiment 2)

Figures 20, 21:
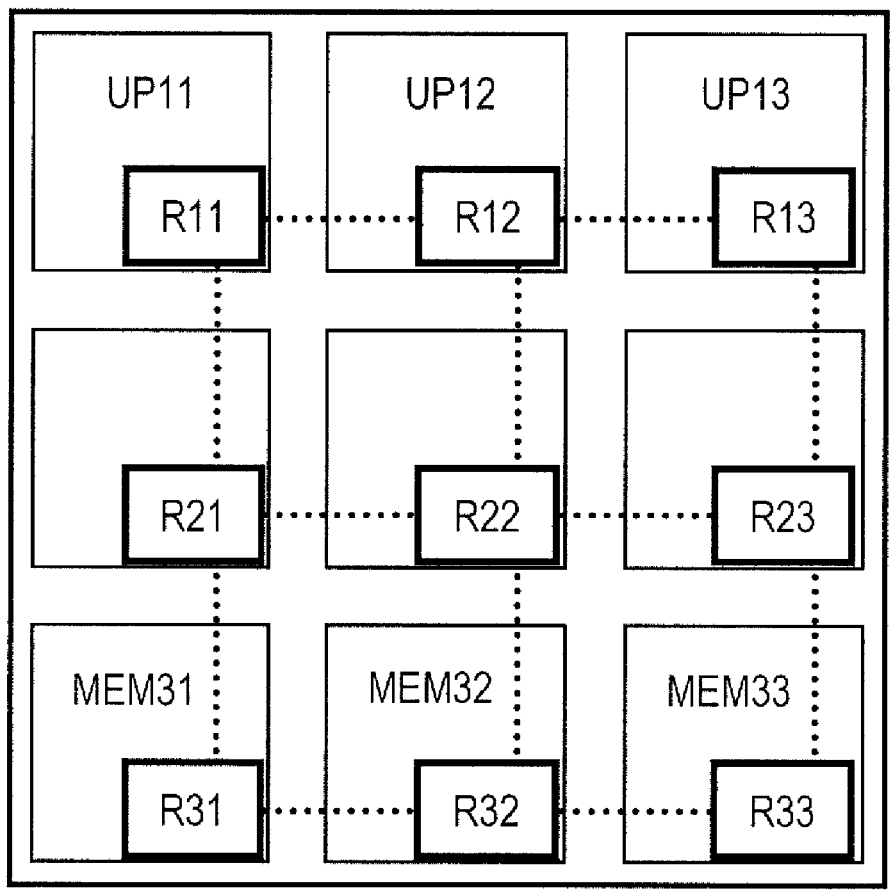
FIG. 20 illustrates an exemplary configuration in which the present invention is applied to a distributed memory architecture.
FIG. 21 shows an example of output information.

FIG. 20 illustrates an exemplary configuration in which the present invention is applied to a distributed memory architecture. In this arrangement, three processors UP11, UP12 and UP13 and three shared memory modules MEM31, MEM32 and MEM33 are connected together with a network of bus controllers that is implemented as a 3×3 mesh. Each of these processors allocates a memory space that is required when a task is started to one of these memory modules, and frees that memory space when the task gets done. However, if the memory spaces were allocated to a particular memory module so often, the access rates would be non-uniform between the memory modules, and the operating frequency on the access bus leading to that particular memory module would increase due to the excessive access, thus causing problems in terms of design and power dissipation. However, if the processor carries out the memory space allocation so that the access rates will be as uniform as possible between the memory modules, the operating frequency on the access bus can be lowered and the power dissipation can be cut down at a time.

Each of the bus controllers that form the distributed memory network of this preferred embodiment has the same configuration as the bus controller of the first preferred embodiment shown in FIG. 14 except the following respects. Thus, description of their common features will be omitted herein.

Packet Assembling Section 103

According to this preferred embodiment, the average and maximum rates, representing the rate characteristics of respective flows between the processors and the memory modules, are supposed to be determined in advance during the design process and those flows are supposed to have the same priority level. If there are flows that have multiple different priority levels, then the processing may be carried out in the same way as in the first preferred embodiment described above. The packet assembling section 103 in each bus controller on the processor side transmits the rate characteristic of a flow that is specified by the task on the processor as additional information by storing that rate information in the header of a data transfer packet as shown in FIG. 15. In this manner, the rate characteristic of the access flow can be conveyed to the bus controller on the memory module side.

Output Monitoring Section 107

In accordance with the rate characteristic that is conveyed on an access flow basis from the bus controller on the processor side, the output monitoring section 107 in the bus controller on the memory module side manages the following estimation equations (11) and (12):

$$\mu_i = \sum_{j=1}^{n} \mu_{ij} \qquad (11)$$

$$p_i^2 = \sum_{j=1}^{n} \mu_{ij}(p_{ij} - \mu_{ij}) \qquad (12)$$

In these Equations (11) and (12), $\mu_{ij}$ and $p_{ij}$ respectively represent the average and maximum rates of the $j^{th}$ access flow to the $i^{th}$ memory module, n represents the total number of access flows that are allocated to the $i^{th}$ memory module, and $\mu_i$ and $p_i$ respectively represent equations for estimating the average and maximum rates of the $i^{th}$ memory module. On receiving an output information request packet from another bus controller, the output monitoring section 107 returns an output information notification packet including the output information shown in FIG. 21.

The access flow rate characteristic conveyed from the bus controller may include information that can be obtained in advance through calculations during the design process. Examples of such information include information about the application that runs on the SoC, the average, maximum and minimum rates generated by the signal processing module, the standard deviation of access rates, the priority levels of processing and a permitted access latency.

As for the flow of a memory access, of which the access rate characteristic cannot be expected during the design process and which may be generated by the user's manipulation on the device, for example, the average and maximum values of access rates may be actually measured by the bus controller on the memory side as already described for the first preferred embodiment to make the calculations represented by Equations (11) and (12).

If the characteristic defined during the design process (which will be referred to herein as "designed characteristic") and the actually measured values are both available, then the designed characteristic had better be used. The reason is as follows. Specifically, in a situation where a control operation is performed based on actually measured values, even if the load on a memory decreases just instantaneously, a lot of bus masters will attempt to allocate an access flow to that memory at the same time. As a result, the extra allocable memory space will have to accommodate excessive flows. That is why if the load and the access latency increase immediately after that, more often than not the respective bus masters will have to re-allocate the access flows all over again. Such a phenomenon is known as "route flapping", which will cause a significant decrease in the throughput of a network and a considerable increase in access latency. If the allocation control is carried out based on the designed characteristic of the flows, however, the access flows allocated can be managed without depending on the instantaneous status of loads, and therefore, such route flapping can be avoided.

Optionally, the output monitoring section 107 in the bus controller on the memory module side may measure and manage the latency in access to the memory connected. In this case, the access latency may be represented by the number of cycles it has taken since the data receiving section 104 has received a data transfer packet including a data read/write request from a processor and until that read/write operation specified is completed. If the output monitoring section 107 has sensed that the margin left is too slim to satisfy the access flow latency request that is defined by the priority level stored in the header of a data transfer packet, then the processor may be notified of a decrease in access quality by sending out an emergent output information notification to the address of the bus controller of the processor that has issued the request as the address of the receiving end.

Route Load Detecting Section 101

Figure 22:
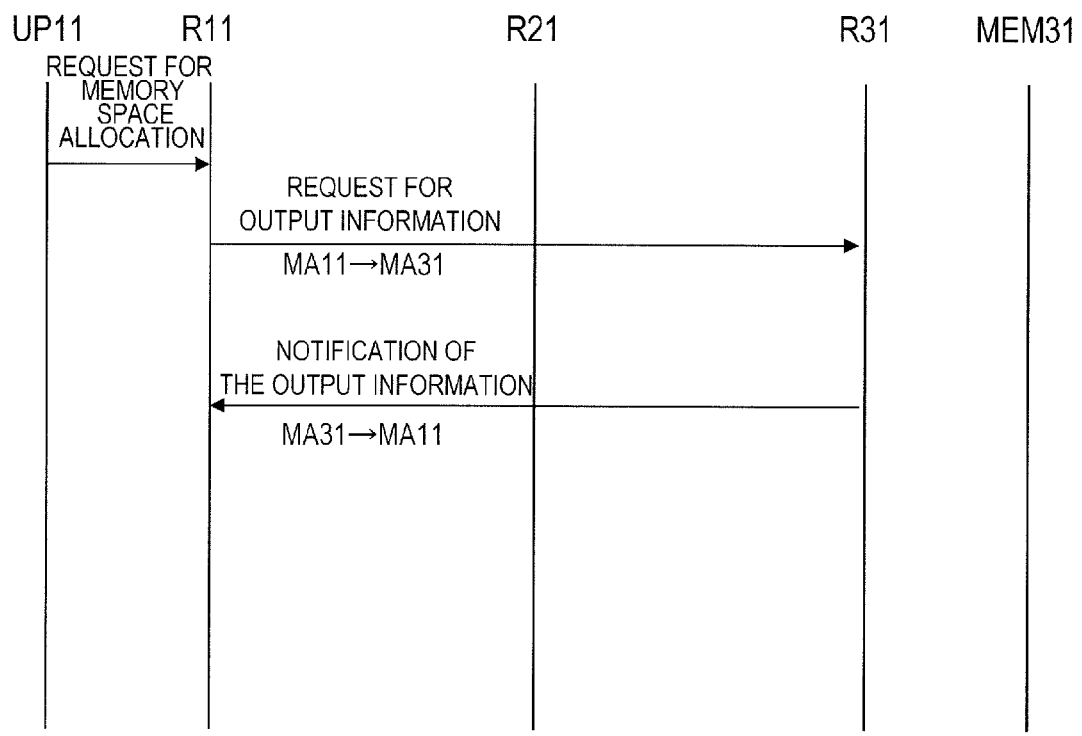
FIG. 22 shows an example of a protocol for collecting the output information.

In the route load detecting section 101, the event of securing a memory space in order to allocate a memory access flow with an average rate μt and a maximum rate pt triggers the processor's sending an output information request packet to the bus controller of each memory module. By sending that output information request packet, the estimated values shown in FIG. 21 are collected. An example of a protocol for collecting the output information is shown in FIG. 22. The estimated flow rate βi of the $i^{th}$ memory that takes a variation in flow with time into consideration is calculated by the following Equation (13):

$$\beta_i = \sum_{j=1}^{n} \mu_{ij} + m \cdot \sqrt{\sum_{j=1}^{n} \mu_{ij}(p_{ij} - \mu_{ij})} \quad (13)$$

where m is an adjustment factor for striking an adequate balance between the magnitude of the statistical multiplexing effect on multiple flows that are allocated to the same memory and the reliability.

On the other hand, the estimated flow rate $\beta'_i$ of the $i^{th}$ memory to which flows have been newly allocated is given by the following Equation (14):

$$\beta'_i = \sum_{j=1}^{n} \mu_{ij} + \mu_t + m \cdot \sqrt{\sum_{j=1}^{n} \mu_{ij}(p_{ij} - \mu_{ij}) + \mu_t(p_t - \mu_t)} \quad (14)$$

If the flow rate status of each memory in a situation where those flows to allocate are allocated to the $i^{th}$ memory is identified by $S_i$, then the flow rate statuses of respective memories are represented by the following Equations (15):

$$S_1 = [\beta'_1 \beta_2 \beta_3]$$

$$S_2 = [\beta_1 \beta'_2 \beta_3]$$

$$S_3 = [\beta_1 \beta_2 \beta'_3] \quad (15)$$

The degree of uniformity in flow rate between the memories in the status $S_i$ may be evaluated by the following Equations (16) and (17):

$$\rho_i = \left(\sum_{k=1}^{n} \hat{\beta}_i\right)^2 / \left(n \cdot \sum_{k=1}^{n} \hat{\beta}_i^2\right) \quad (16)$$

$$\hat{\beta}_i = \begin{cases} \beta_i & (k \neq i) \\ \beta'_i & (k = i) \end{cases} \quad (17)$$

where n represents the number of memory modules.

By determining the memory module to which the flows need to be allocated by Equation (18), the most significant statistical multiplexing effect can be expected with the variation in flow with time taken into account and the degree of uniformity in access rate between the memories can be increased.

$$q = \text{index of max}\{\rho_i\} \quad (18)$$

The route load detecting section 101 notifies the processor that a $q^{th}$ memory has been allocated to the task specified. The task on the processor recognizes the address of the receiving end of a data transfer packet being sent to a memory as the address of the $q^{th}$ memory.

In this manner, the memory to which the flows need to be actually allocated is determined by comparing the flow rates Si of respective memories to which the flows have been virtually allocated as represented by Equations (14) and (15) instead of comparing the flow rates $\beta_i$ of the memories to which the flows to allocate have not been allocated yet as represented by Equation (13). As a result, the relation between the group of flows that have already been allocated and the access flows yet to be allocated can also be taken into consideration with respect to each memory. As a result, the memory to allocate those flows to can be chosen more appropriately. Suppose an access flow that changes significantly with time needs to be newly allocated. By choosing a route to which a group of flows that change significantly with time has been allocated, the given band can be used more efficiently due to the statistical multiplexing effect than in a situation where a group of flows that certainly had a great flow rate before allocation but that hardly change with time after that has been allocated to a memory. Such a situation can be coped with by determining, by the degree of uniformity after the virtual allocation, what memory the flows should be allocated to.

Also, on receiving the emergent output information notification packet that has been sent out by output monitoring section 107 in the bus controller on the memory module side in order to notify a decline in access quality, the route load detecting section 101 dynamically controls the value of the adjustment factor m, which is represented by Equations (13) and (14), in accordance with that information. As a result, the degree of reliability about the access quality can be improved. The initial value of the adjustment factor m that is managed by the route load detecting section 101 is defined by the following Equation (19):

$$m = m_0 \tag{19}$$

The initial value of m may be set to be five, for example.

Meanwhile, as a parameter for controlling m, $\alpha$ is initialized as represented by the following Equation (20):

$$\alpha = \alpha_0 \tag{20}$$

The initial value may be set to be one, for example.

Having sensed that the access quality has declined on receiving the emergent output information notification packet, the route load detecting section 101 changes the $\alpha$ value by the following Equation (21):

$$\alpha = \alpha - \Delta\alpha \tag{21}$$

where $\Delta\alpha$ is a positive variation that has been caused through the reception of N emergent output information notification packets. For example, the N value may be set to be one and $\Delta\alpha$ may be set to be 0.5.

The value of the adjustment factor m is controlled with the dynamics represented by the following Equation (22):

$$\Delta m = \left(1 - \frac{1}{1 + e^{-k(\alpha - \Delta\alpha)}}\right) \cdot$$
$$[\delta(\alpha - \alpha_0) + \delta(\alpha - \alpha_0 + \Delta\alpha)] + [\eta \bmod(m_{max} - m_{min} + 1)] \cdot \delta(\alpha) \tag{22}$$

where $m_{max}$ and $m_{min}$, respectively represent the maximum and minimum values of the adjustment factor m, which have been determined in advance and which may be set to be seven and five, respectively, k represents an adjustment parameter, which may be set to be 100, for example, $\delta$ represents a Kronecker delta function, and $\eta$ represents a random positive integer.

According to Equation (22), it can be seen that the adjustment factor m may be updated as in the following Equation (23):

$$m = m + \Delta m \tag{23}$$

If the processing is carried out based on this mathematical equation, the less smoothly data flows, the larger the value of $\Delta m$, and so is the value of m.

If the m value has exceeded the maximum value as a result of the update, then the adjustment factor may be selected at random by setting $\alpha = 0$. And when the update of the adjustment factor m is finished, $\alpha$ may be initialized again by Equation (2). By controlling the adjustment factor m, an adequate balance can be struck between the degree of uniformity of memory allocation and the statistical multiplexing effect and the operating frequency of the bus that can accommodate the flows can be lowered as intended even if the rate variation characteristic of each flow does not conform to the predicted probability distribution.

The second preferred embodiment of the present invention has just been described.

In the preferred embodiment described above, the topology of the NoC is supposed to be a two-dimensional mesh. However, this is just an example of the present invention. Rather the flow control of the present invention is also applicable to any other topology as well. For example, a two-dimensional torus may also be adopted as an alternative topology. In a still alternative topology, pairs of bus masters and their associated bus controllers may be arranged in a ring, each pair of adjacent bus controllers may be connected together with a bus, and each pair of bus controllers that face each other across the ring may also be connected together with a bus. Furthermore, the topology to use does not always have to be a two-dimensional one but may also be a three-dimensional one as well. In that case, each bus master and its associated bus controller may form a dice-tucked pair and the bus controllers may be connected together three-dimensionally.

(Embodiment 3)

A bus controller as a third specific preferred embodiment of the present invention is also applicable to the distributed memory architecture shown in FIG. 20 as in the second preferred embodiment of the present invention described above. However, as such a distributed memory architecture has already been described for the second preferred embodiment, the description thereof will be omitted herein.

Each of the bus controllers that form the distributed memory network of this preferred embodiment has the same configuration as the bus controller 2 of the second preferred embodiment shown in FIG. 14 except the following respects. Thus, description of their common features will be omitted herein.

Route Load Detecting Section 101

In this preferred embodiment, Equation (16) adopted in the second preferred embodiment described above may be replaced with the following Equation (24):

$$\rho_i = \begin{cases} 1 & (\max\{\hat{\beta}_i\} = 0) \\ \dfrac{\min\{\hat{\beta}_i\}}{\max\{\hat{\beta}_i\}} & (\text{otherwise}) \end{cases} \tag{24}$$

It is determined by the following Equation (25) what memory module a flow needs to be allocated to when the degree of uniformity of the flow is a preferential index.

$$q_0 = \text{index of } \max\{\rho_i\} \tag{25}$$

On the other hand, from the standpoint of the processor that has generated the flow to allocate, the memory module that is located in close proximity is not necessarily $q_0$. In this description, the "memory module that is located in close proximity" (which will be referred to herein as a "proximate memory module") refers to a memory module that is presumed to be accessible with the least latency for the processor.

In the example illustrated in FIG. 20, the three shared memory modules MBM31, MBM32 and MBM33 are supposed to be respectively two-, three- and four-hops away from the processor UP11. Thus, in the stage of a design process, the shared memory module MBM31 can be defined as the proximate memory module of the processor UP11. The proximate memory module identifier $q_1$ that is defined for each processor may form part of design information about an SoC, for example. That identifier $q_1$ may be either hard-coded beforehand inside its associated processor or the route load detecting section of an NoC router that is connected to the processor or selected by transmitting and receiving a measuring packet during the initialization.

ρi given by Equation (24) indicates the degree of uniformity after the flow to allocate has been allocated to the memory module i. On the other hand, an index indicating the degree of uniformity when the flow to allocate has not been allocated yet (i.e., an index indicating the actual degree of uniformity at that point in time) is given by the following Equation (26):

$$\rho = \begin{cases} 1 & (\max\{\beta_i\} = 0) \\ \dfrac{\min\{\beta_i\}}{\max\{\beta_i\}} & (\text{otherwise}) \end{cases} \quad (26)$$

where ρ is a positive integer that is not greater than one.

Also, based on $\beta_i$ that has been calculated as the current estimated flow rate for each memory module by Equation (13), γ given by the following Equation (27) can be calculated:

$$\gamma = \max\left\{\dfrac{\beta_i}{b \cdot c}\right\} \quad (27)$$

where b represents the bus width, c represents the operating frequency of the bus, and γ represents the number of flits that have been accessed during one cycle time. In a situation where the accesses generated do not exceed the physical band, the number of flits is never greater than one. γ can be an index representing the highest rate of flows to allocate to one of various memory modules.

The route load detecting section 101 determines, based on the values of ρ and γ, what memory module q the flows should be allocated to. According to the simplest method, the target memory module may be determined in accordance with the following conditional equation (28):

$$q = \begin{cases} q_0 & (\gamma > \Gamma_{th} \wedge \rho < P_{th}) \\ q_1 & (\text{otherwise}) \end{cases} \quad (28)$$

Γth and Pth are threshold values, which may be predefined values. In a light load range in which memory modules are accessed too lightly to cause uniformity problem between the memory modules, the proximate memory module is selected as the module to allocate flows to, and a memory module $q_1$, which is located in close proximity and which has low latency (e.g., the lowest latency), is selected. On the other hand, in medium to heavy load ranges in which the flows allocated to the memories increase so much that the non-uniform access distribution between the memory modules will affect the performance, the memory module q0 is selected with the degree of uniformity in flow rate given a top priority. By changing the weight added to the degree of uniformity in flow rate according to the situation in this manner, the throughput can be increased.

According to another method for determining q, either $q_0$ or $q_1$ may be chosen by each processor autonomically. The following Equation (29) dominates the dynamics of a variable $m_i$ and η in Equation (29) represents a random noise. The dynamics of α in the following Equations (29), (30) and (31) are controlled by the following Equation (32) where δ and K are constants:

$$\begin{cases} \dfrac{dm_1}{dt} = \dfrac{\mathrm{syn}(\alpha)}{1+m_2^2} - \deg(\alpha) \cdot m_1 + \eta_1 \\ \dfrac{dm_2}{dt} = \dfrac{\mathrm{syn}(\alpha)}{1+m_1^2} - \deg(\alpha) \cdot m_2 + \eta_2 \end{cases} \quad (m_1 > m_2) \quad (29)$$

$$\begin{cases} \dfrac{dm_1}{dt} = \dfrac{\mathrm{syn}(1.5-\alpha)}{1+m_2^2} - \deg(1.5-\alpha) \cdot m_1 + \eta_1 \\ \dfrac{dm_2}{dt} = \dfrac{\mathrm{syn}(1.5-\alpha)}{1+m_1^2} - \deg(1.5-\alpha) \cdot m_2 + \eta_2 \end{cases} \quad (m_1 \le m_2)$$

$$\mathrm{syn}(\alpha) = \dfrac{6\alpha}{2+\alpha} \quad (30)$$

$$\deg(\alpha) = \alpha \quad (31)$$

$$\dfrac{d\alpha}{dt} = \delta \cdot \left[0.5 \cdot \left(1 + \dfrac{1}{1+e^{-K_\gamma(\gamma - \Gamma_{th})}}\right) \cdot \left(1 - \dfrac{1}{1+e^{-K_\rho(\rho - P_{th})}}\right)\right) - \alpha\right] \quad (32)$$

The target memory module to allocate flows to may be determined by the following decision Equation (33):

$$q = \begin{cases} q_0 & (m1 < m2) \\ q_1 & (m1 > m2) \end{cases} \quad (33)$$

As a result, the choice between $q_0$ and $q_1$ can be made autonomically and stepwise between one pair of processors after another, and therefore, the band can be used non-wastefully and the throughput can be increased.

The route load detecting section 101 notifies the processor that the $q^{th}$ memory module has been allocated to the task in question. The task on the processor recognizes the address of the receiving end of a data transfer packet being sent to the target memory module as the address of the $q^{th}$ memory module.

Figure 23:
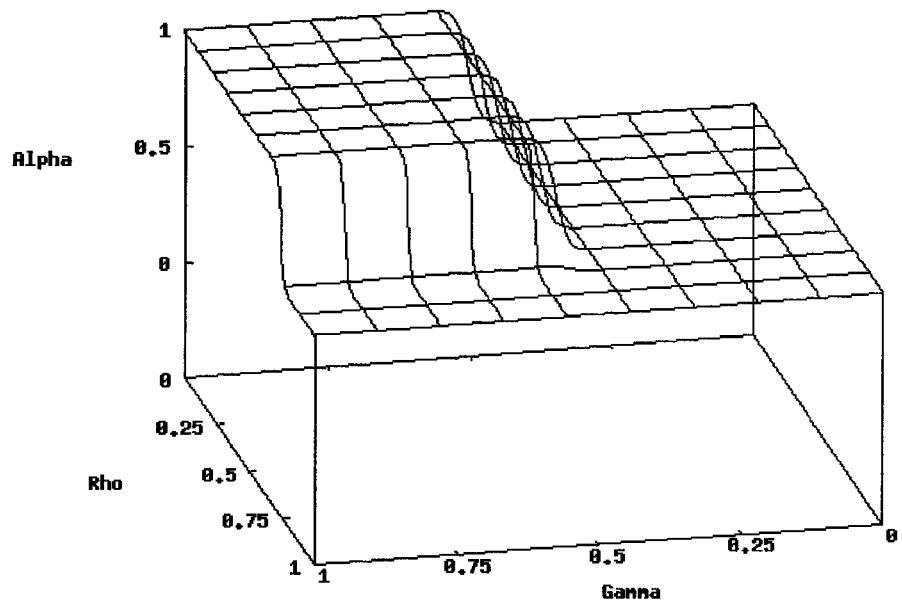
FIG. 23 shows a result of a performance evaluation that the present inventors carried out on the bus controller of the third preferred embodiment using an NoC simulator.

FIG. 23 shows a result of a performance evaluation that the present inventors carried out on the bus controller of this preferred embodiment using an NoC simulator. This result shows the profile of α that was obtained by setting K γ=Kρ=100, Γth=0.5, and Pth=0.75 in Equation (32). It can be seen that if γ and ρ move within the closed interval [0, 1], α also varies within the closed interval [0.5, 1.0].

Figure 24:
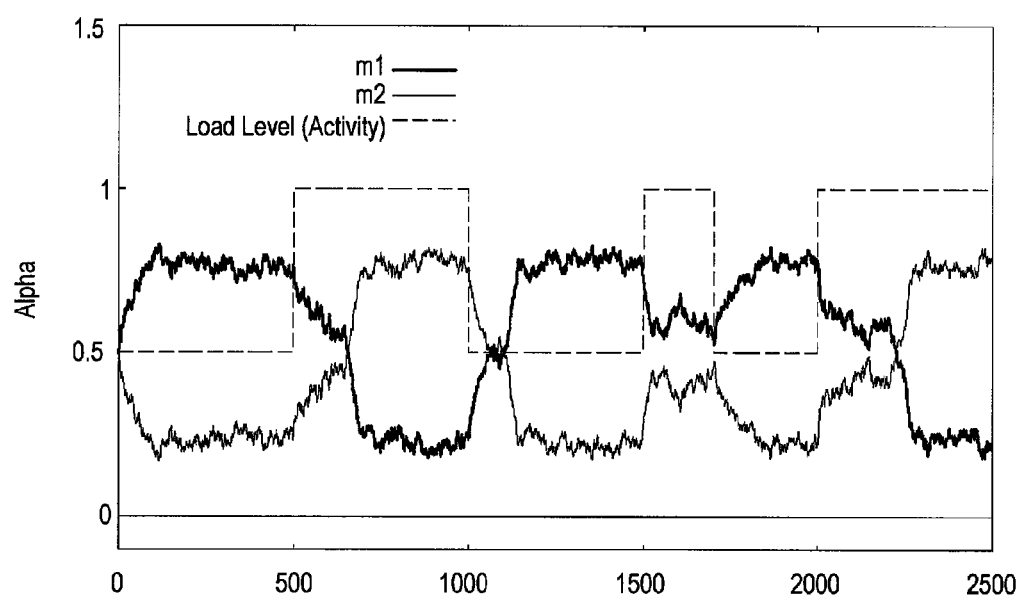
FIG. 24 shows how $m_1$ and $m_2$ change with time in a situation where $\eta i$ of Equation (29) is supposed to be a random noise that follows a uniform distribution that varies within the closed interval [−0.05, +0.05].

FIG. 24 shows how $m_1$ and $m_2$ change with time in a situation where ηi of Equation (29) is supposed to be a random noise that follows a uniform distribution that varies within the closed interval [−0.05, +0.05]. In FIG. 24, the abscissa represents the time. It can be seen that the relation in level between $m_1$ and $m_2$ changes as α varies. In accordance with Equation (33), if $m_1$ is under $m_2$, q0 is chosen. On the other hand, if $m_1$ is over $m_2$, q1 is selected. In order to prevent the sign of $m_1$ and $m_2$ from ever going zero, numerical value processing that resets $m_1$ or $m_2$ that has gone negative due to $\eta_i$ into zero automatically is performed.

In the time intervals [500, 1000] and [2000, 2500], since α=1.0, $m_2$ becomes greater than $m_1$ and the target of allocation is selected according to the degree of uniformity. In the time interval [1500, 1700], on the other hand, there are no such changes and latency-based allocation is still made on the proximate one. Thus, it can be seen that the allocation to the proximate one is continued due to a decrease in α that has been caused by a variation in another processor.

According to this method, if every processor changes their targets of allocation at the same time, it is possible to avoid an unwanted situation where only a few memory modules are accessed excessively. As a result, the allocation methods can be changed gradually with the degree of uniformity in flow rate and latency given high priorities.

Figure 25:
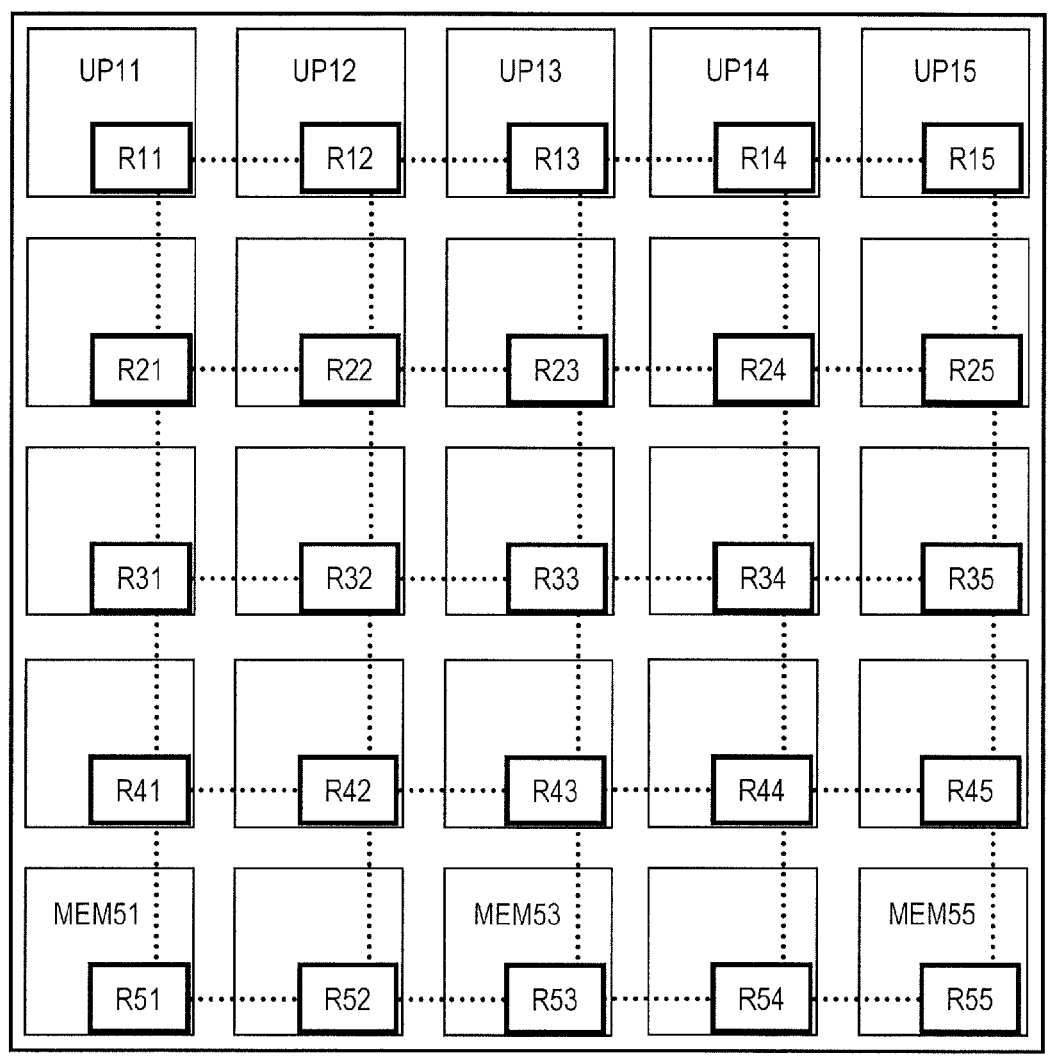
FIG. 25 illustrates a configuration for an NoC that was used to carry out the simulation.

FIG. 25 illustrates a configuration for an NoC that was used to carry out the simulation. In this case, the NoC has a 5×5 square mesh topology in which five processors UP11 through UP15 and three memory modules MEM51, MEM53 and MEM55 are connected together.

In this example, each processor UP generated flows so that data in one packet would be sent toward a target memory module MEM once in every predetermined number of cycles. The packet length is fixed at four flits. Each processor UP generated 20 flows, of which five were 1× flows, another five were 10× flows and the other ten were 100× flows. Each of 1×, 10× and 100× represents the data transfer rate of that flow. For example, a 10× flow sends only one packet while a 100× flow sends ten packets. And a 1× flow sends only one packet while a 10× flow sends ten packets. That is to say, the packet sending interval of a 1× flow is ten times as long as that of a 10× flow, and the packet sending interval of a 10× flow is ten times as long as that of a 100× flow.

Figure 26:
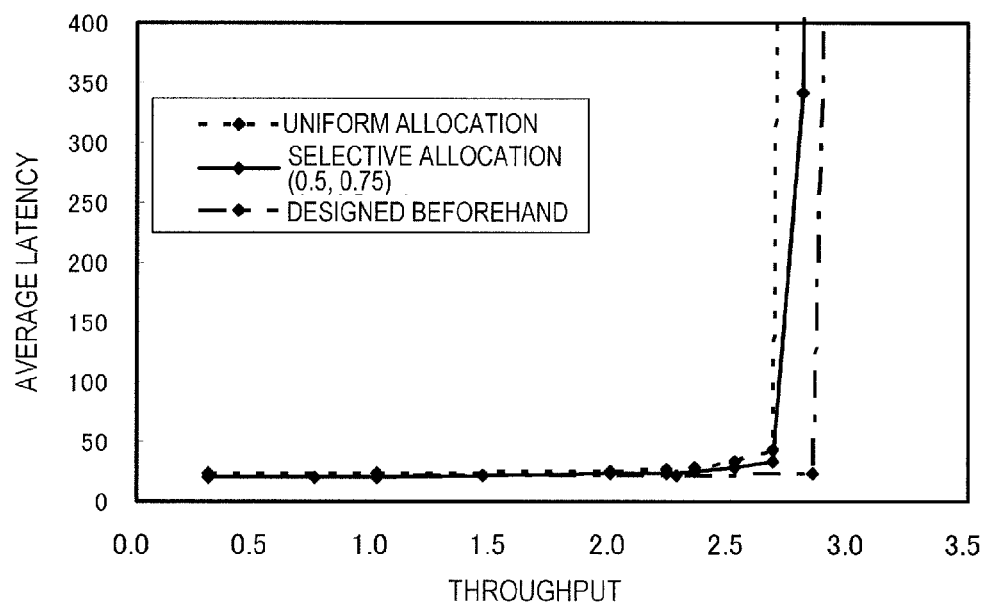
FIG. 26 shows a relation between the throughput and the latency on the memory module side.
Figure 27:
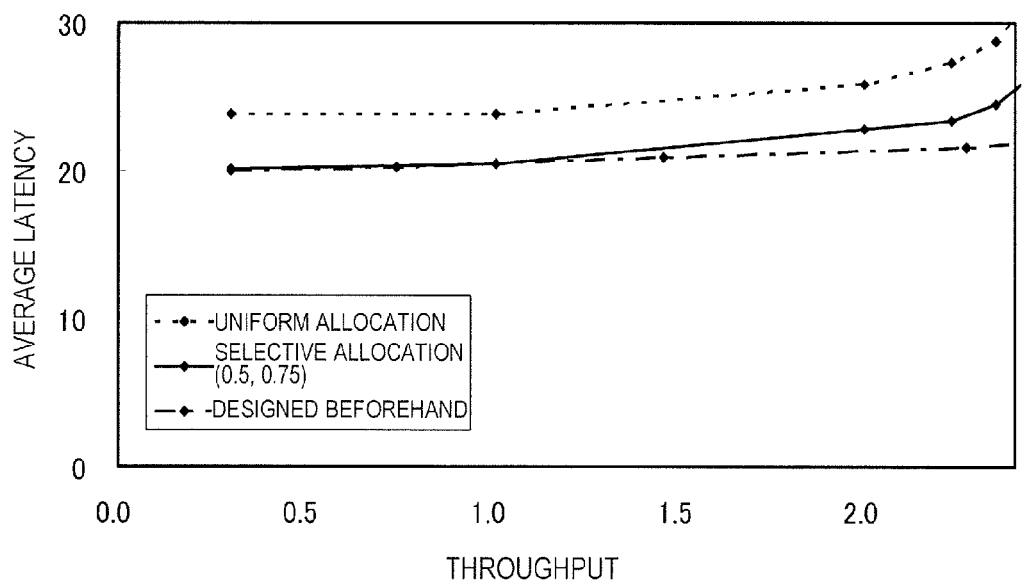
FIG. 27 shows a relation between the throughput and the latency on the memory module side.

Also, the routing protocol was defined with XY dimensional forward routing. The switching protocol was supposed to be wormhole switching. Each router had a configuration with four virtual channels, each of which had Size 4. The respective flows started to be sent with a delay of several cycles caused between them so that no flows would interfere with each other at the entrance of the mesh network. FIGS. 26 and 27 show how the throughput changed with the latency on the memory module side, which was summarized by the present inventors based on the simulation data. In FIGS. 26 and 27, the abscissa represents the sum of the throughputs of the respective memory modules MEM51, MEM53 and MEM55. The throughput of each single memory module was obtained by dividing the number of flits that were received during the simulation period by the total number of cycles of the simulation period. If no flits are received at all during the simulation period, the throughput will be zero. On the other hand, if flits are received continuously, the throughput will be one. And if one flit is received every other cycle, the throughput will be 0.5.

In the example illustrated in FIG. 25, since there are three memory modules, the maximum value of the throughput is three. The latency represented by the ordinate is obtained by calculating the difference between the time stamp of point in time when the processor generated a flit and that of a point in time when the memory module receives that flit. Every one of four flits that form a single packet has the same time stamp when generated.

FIG. 26 is a graph showing results of simulations that were carried out for as many as 4000 cycles. With this graph, it can be seen on comparison how the performance will change according to the method of allocation adopted.

Specifically, the curve labeled as "uniform allocation" indicates a result that was obtained by always choosing q0 irrespective of the α value. On the other hand, the curve labeled as "selective allocation" indicates a result that was obtained by choosing either q0 or q1 according to the α value. It can be confirmed that a performance represented by a saturated throughput of approximately 2.7 was achieved. The physical band that could be used in this simulation was 3.0, and therefore, approximately 90% of the physical band could be used.

On the other hand, FIG. 27 shows results of the same simulations but illustrates the throughput-latency relation in a light load range on a larger scale. With this graph, it can be seen on comparison how the performance will change in the light load range according to the method of allocation adopted. It can be seen that by choosing either q0 or q1, the latency could be shortened by approximately five cycles compared to always choosing q0. Thus, it can be seen that by choosing one of the two targets at the time of allocation, the throughput-latency characteristic could be improved even in the light load state.

In the preferred embodiment described above, the topology of the NoC is supposed to be a two-dimensional mesh. However, this is just an example of the present invention. Rather the flow control of the present invention is also applicable to any other topology as well. For example, a two-dimensional torus may also be adopted as an alternative topology. In a still alternative topology, pairs of bus masters and their associated bus controllers may be arranged in a ring, each pair of adjacent bus controllers may be connected together with a bus, and each pair of bus controllers that face each other across the ring may also be connected together with a bus. Furthermore, the topology to use does not always have to be a two-dimensional one but may also be a three-dimensional one as well. In that case, each bus master and its associated bus controller may form a dice-tucked pair and the bus controllers may be connected together three-dimensionally.

(Embodiment 4)

The preferred embodiments of the present invention described above relate to exemplary implementation of the present invention on a chip.

However, the present invention can be carried out not just as such on-chip implementation but also as a simulation program for performing design and verification processes before that on-chip implementation process. And such a simulation program is executed by a computer. According to this preferred embodiment, the respective elements shown in FIG. 14 are implemented as a class of objects on the simulation program. By loading a predefined simulation scenario, each class gets the operations of the respective elements of the preferred embodiments described above performed by the computer. In other words, the operations of the respective elements are carried out either in series or in parallel to/with each other as respective processing steps by the computer.

A class that is implemented as bus masters gets such a simulation scenario, which has been defined by a simulator, loaded, thereby setting conditions on the timings to send packets virtually to a class of bus controllers. Then, the transmission statuses of the routes shown in FIG. 13 are simulated and compared to each other as in the first and second preferred embodiments described above, thereby performing the operation of determining the transmission routes.

The class that is implemented as bus masters performs its operation until the condition to end the simulation, which is described in the simulation scenario, is satisfied, thereby calculating and getting the throughput and latency during the operation, a variation in flow rate on the bus, and estimated operating frequency and power dissipation and providing them to the user of the program. And based on these data provided, the user of the program evaluates the topology and performance and performs design and verification processes.

For example, various kinds of information such as the IDs of bus masters on the transmitting and receiving ends, the size of a packet to send, and the timing to send the packet is usually described on each row of the simulation scenario. Optionally, by evaluating a plurality of simulation scenarios in a batch, it can be determined efficiently whether or not the intended performance is ensured by every possible scenario imagined. Furthermore, by comparing the performance with the topology or the number of nodes of the bus and/or the arrangement of the processors, DSPs, memories and peripheral IOs changed, it can be determined what network architecture is best suited to the simulation scenario. In that case, each of the first, second and third preferred embodiments of the present invention described above can be used as design and verification tools for this preferred embodiment. That is to say, the present invention can also be carried out as such design and verification tools.

The present invention can be carried out as a network bus controller and control method and program by applying its data transfer route control technique to the on-chip bus of an SoC for built-in computers, general-purpose processors, and the local bus of a DSP.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. A bus controller that is arranged between a bus master and a networked communication bus in order to control a transmission route of a packet that flows through the communication bus, the controller comprising:
a data receiving section for receiving information about output status from other bus controllers, which exist on multiple transmission routes available;
a route load detecting section for calculating uniformity of distribution index indicating a degree of non-uniformity in transmission flow rate between the respective transmission routes based on one of maximum, average with time and minimum values of numbers of bus cycles of output ports, priority level of packet transfer, and weights added to the maximum, average and minimum values that are provided for the respective priority levels, all of which are included in information about the output status;
a routing section for determining multiple transmission routes, of which the transmission flow rates have been adjusted by reference to the uniformity of distribution index;
a packet assembling section for generating the packet based on data that has been received from the bus master;
a data output section for outputting the packet through one of multiple output ports, which are connected to mutually different communication buses; and
a header analyzing section for determining which one of the multiple output ports is connected to one of the transmission routes that has been chosen by reference to information about a receiving end of the packet.

2. The bus controller of claim 1, wherein the route load detecting section calculates the uniformity of distribution index by adding an average rate µt and a maximum rate pt of packets to allocate to an index that is based on the average and maximum rates of packets currently allocated.

3. The bus controller of claim 1, further comprising an output monitoring section for providing information about a data output status of the data output section in response to a request that has been received from the other bus controllers.

4. The bus controller of claim 3, wherein the route load detecting section is notified by the output monitoring section of the output status, which includes at least an average value of frequencies of occurrence of transfer that are associated with respective priority levels of flows to output, and calculates the uniformity of distribution index based on that average value.

5. The bus controller of claim 3, wherein the route load detecting section is notified by the output monitoring section of the output status, which includes at least an average and maximum values of frequencies of occurrence of transfer that are associated with respective priority levels of flows to output, and calculates the uniformity of distribution index based on the average and maximum values.

6. The bus controller of claim 5, wherein the route load detecting section includes a parameter defining a degree of reliability of an estimate that results from a statistical multiplexing effect included in the uniformity of distribution index.

7. The bus controller of claim 6, wherein the route load detecting section adjusts the parameter defining a degree of reliability by sensing a deterioration in a transfer status of the packet and,
wherein unless the transfer status improves even by adjusting the parameter, the route load detecting section makes a probability-based adjustment on the parameter.

8. The bus controller of claim 3, wherein on receiving the request for the information about the output status that has been issued at a predetermined timing, the output monitoring section returns that information.

9. The bus controller of claim 3, wherein the route load detecting section notifies the output monitoring section in advance of a condition for sending the information about the output status, and
wherein the output monitoring section has been notified in advance of the condition for sending the information about the output status and is provided with that information if the information sending condition is satisfied.

10. The bus controller of claim 1, wherein the route load detecting section adds a weight representing a priority level of flow of each said transmission route to the information about the output status, thereby calculating an estimated transmission flow rate of each said transmission route and then calculating the uniformity of distribution index indicating the degree of non-uniformity in transmission flow rate between the respective transmission routes.

11. The bus controller of claim 10, wherein the route load detecting section calculates, as the uniformity of distribution index, a statistical value based on estimated transmission flow rates of the respective transmission routes.

12. The bus controller of claim 1, wherein the route load detecting section calculates the uniformity of distribution index indicating the degree of non-uniformity in transmission flow rate between the respective transmission routes based on, not only information about the output status, but also information about data properties of the transmission routes.

13. A simulation program, stored on a non-transitory computer-readable medium, for use to design a bus controller that is arranged between a bus master and a networked communication bus in order to control the transmission route of a packet that flows through the communication bus,
the simulation program causes a computer to execute the steps of:
receiving information about output status from a class of other bus controllers, which are represented as objects on the simulation program and which exist on multiple transmission routes available;

calculating uniformity of distribution index indicating a degree of non-uniformity in transmission flow rate between the respective transmission routes based on one of maximum, average with time and minimum values of numbers of bus cycles of output ports, a priority level of packet transfer, and weights added to the maximum, average and minimum values that are provided for the respective priority levels, all of which are included in information about the output status;

determining multiple transmission routes, of which the transmission flow rates have been adjusted by reference to the uniformity of distribution index;

generating the packet based on data that has been received from a class that is implemented as the bus master;

outputting the packet through one of multiple output ports, which are connected to mutually different communication buses;

determining which one of the multiple output ports is connected to one of the transmission routes that has been chosen by reference to information about a receiving end of the packet; and outputting the packet through the output port selected.

* * * * *